United States Patent
Tanaka

(10) Patent No.: US 7,416,173 B2
(45) Date of Patent: Aug. 26, 2008

(54) PNEUMATICALLY SWITCHABLE TYPE FLUID-FILLED ENGINE MOUNT

(75) Inventor: Eiji Tanaka, Komaki (JP)

(73) Assignee: Tokai Rubber Industries, Ltd., Komaki (JP)

(*) Notice: Subject to any disclaimer, the term of this patent is extended or adjusted under 35 U.S.C. 154(b) by 372 days.

(21) Appl. No.: 11/132,410

(22) Filed: May 19, 2005

(65) Prior Publication Data

US 2005/0258581 A1 Nov. 24, 2005

(30) Foreign Application Priority Data

May 24, 2004 (JP) ............... 2004-153868
May 28, 2004 (JP) ............... 2004-160332

(51) Int. Cl.
*F16F 9/00* (2006.01)
*F16M 5/00* (2006.01)

(52) U.S. Cl. .............. 267/140.13; 267/140.15

(58) Field of Classification Search ............ 267/140.11, 267/140.12, 140.13, 140.14, 140.15
See application file for complete search history.

(56) References Cited

U.S. PATENT DOCUMENTS

| | | | | |
|---|---|---|---|---|
| 5,642,873 | A | 7/1997 | Kato | 267/140.14 |
| 5,769,402 | A | 6/1998 | Ide et al. | 267/140.14 |
| 6,244,578 | B1 * | 6/2001 | Schwerdt | 267/140.13 |
| 6,264,181 | B1 | 7/2001 | Muramatsu et al. | |
| 6,406,010 | B1 * | 6/2002 | Yano et al. | 267/140.14 |
| 6,523,816 | B1 * | 2/2003 | Gastineau et al. | 267/140.14 |
| 6,612,554 | B1 * | 9/2003 | Linn | 267/140.13 |
| 2001/0026038 | A1 | 10/2001 | Muramatsu et al. | |
| 2002/0158388 | A1 | 10/2002 | Itoh et al. | 267/140.11 |
| 2003/0098533 | A1 * | 5/2003 | Nishi et al. | 267/140.11 |

FOREIGN PATENT DOCUMENTS

| | | |
|---|---|---|
| JP | U-02-025749 | 2/1990 |
| JP | U-03-99251 | 10/1991 |
| JP | A-05-118375 | 5/1993 |
| JP | Y2-07-29323 | 7/1995 |
| JP | A-08-270718 | 10/1996 |
| JP | A-09-310732 | 12/1997 |
| JP | A-2000-310274 | 11/2000 |
| JP | A-2001-200884 | 7/2001 |
| JP | A-2002-005225 | 1/2002 |
| JP | A-2003-74617 | 3/2003 |

* cited by examiner

*Primary Examiner*—Melody M Burch
(74) *Attorney, Agent, or Firm*—Oliff & Berridge, PLC

(57) ABSTRACT

A fluid-filled engine mount, including: an elastic body connecting a first and a second mounting member; a pressure receiving chamber partially defined by the rubber elastic body; an equilibrium chamber partially defined by a flexible layer, a first orifice passage connecting between the pressure receiving and equilibrium chambers and tuned to a low frequency range, a second orifice passage connecting the both chambers and tuned to a medium frequency range; a valve member for opening/closing the second orifice passage and operated by a pneumatic actuator; a movable partition member including a rigid center movable plate portion and a readily deformable outer peripheral rubber film portion supported fluid-tightly by the second mount portion; and an intermediate equilibrium chamber formed opposing to the pressure receiving chamber with the movable partition member interposed therebetween.

10 Claims, 13 Drawing Sheets

PNEUMATICALLY SWITCHABLE TYPE FLUID-FILLED ENGINE MOUNT

INCORPORATED BY REFERENCE

The disclosure of Japanese Patent Application No. 2004-153868 filed on May 24, 2004 and No. 2004-160332 filed on May 28, 2004, each including the specification, drawings and abstract are incorporated herein by reference in its entirety,

BACKGROUND OF THE INVENTION

1. Field of the Invention

The present invention relates to an engine mount for vibration-isolating support of a power unit on a body of an automobile, and more particularly to a fluid-filled engine mount of improved construction, that utilizes the flow action of non-compressible fluid sealed in its interior to produce effective vibration damping action against vibration of multiple, wide frequency ranges, such as engine shake and idling vibration.

2. Description of the Related Art

There are known in the art, as an engine mount for use in automotive vehicles, an engine mount of fluid-filled design having a first mount fixture and a second mount fixture for respective attachment to either the power unit or the vehicle body, a rubber, elastic body elastically connecting the fixtures, a pressure receiving chamber whose wall is partially formed by the rubber elastic body, and an equilibrium chamber whose wall is partially formed by a readily deformable flexible layer. A non-compressible fluid is sealed within the pressure receiving chamber and equilibrium chamber, and an orifice passage is provided for a communication between the two chambers.

Typically, an automotive engine mount is required to meet a variety of vibration to be damped whose frequencies differ depending on driving conditions. However, vibration-damping action based on flow action of fluid flowing through the orifice passage is limited to a relatively narrow frequency band to which the orifice passage has been pre-tuned.

The present assignee has been proposed in JP-A-8-270718, a pneumatically switchable type, fluid filled engine mount including: a first orifice passage tuned to the frequency of a first vibration to be damped; a second orifice passage tuned to the frequency of another vibration to be damped in a higher frequency band than the tuning frequency of the first orifice passage; a valve member for opening/closing the second orifice passage; and a pneumatic actuator that utilizes air pressure exerted from the outside to drive the valve member. In this engine mount, the valve member is driven so that the second orifice passage is placed in the closed state by means of atmospheric pressure exerted on the pneumatic actuator from the outside, or so that the second orifice passage is placed in the open state by means of negative pressure exerted from the outside, whereby the first orifice passage and second orifice passage are made to function selectively depending on the vibration to be damped, thereby producing the desired vibration damping action.

In recent years, an even higher level of vibration damping performance has come to be required, and in some instances the engine mount taught in JP-A-8-270718 is not sufficient to affords the required level of vibration damping performance. One required characteristic is damping ability against high frequency vibration such as running booming noise, which can be a problem during driving. Another required characteristic is damping ability against low frequency vibration such as engine shake, which can be a problem during driving. With regard to this latter low frequency vibration, damping ability against two types of vibration, namely low frequency; large amplitude vibration which is a problem when driving over speed bumps or the like, and low frequency, small amplitude vibration which is a problem during normal driving.

To coop with the first instance the required characteristic of damping ability against high frequency vibration, the present applicant has been proposed, as taught in JP-U-2-25749, to dispose a rigid movable plate in the partition wall that divides the pressure receiving chamber and the equilibrium chamber so that the plate is displaceable over a very small distance, whereby when high frequency vibration above the tuning frequency band of the first orifice passage and second orifice passage is input, pressure fluctuations in the pressure receiving chamber are absorbed by a very small level of displacement of the movable plate, creating lower dynamic spring.

However, when such a movable plate is employed, there is a risk that pressure fluctuations occurring in the pressure receiving chamber will be absorbed by displacement of the movable plate, even at times of input of small amplitude vibration in the low frequency range. This makes it difficult to ensure adequate fluid flow level through the first orifice passage tuned to the low frequency range, resulting in the difficulty in achieving sufficient attenuating action on low frequency, small amplitude vibration. Additionally, the rigid movable plate needs a gap on the outer peripheral side of the movable plate in order to permit slight displacement thereof, likely permitting a leak of fluid pressure from the pressure-receiving chamber to the equilibrium chamber through the gap. As a result, pressure fluctuations occurring in the pressure receiving chamber during input of low frequency, small amplitude vibration or medium frequency, medium amplitude vibration can leak, making it difficult to assure adequate fluid flow level through the first and second orifice passages, with the resultant problem of a decline in damping ability against the low amplitude component of engine shake and the medium amplitude component of idling vibration.

With the foregoing in view, the present application has also proposed, as taught in JP-A-9-310732, to dispose a movable film consisting of thin rubber film in place of the rigid movable plate, whereby liquid pressure absorbing action based on elastic deformation of the movable film provides lower dynamic damping of high frequency vibration above the tuning frequency range of the second orifice passage.

However, it was found that, just as with the movable plate mentioned earlier, when such a movable film was employed, there was a risk that elastic deformation of the movable film would absorb pressure fluctuations in the pressure receiving chamber, including low frequency, small amplitude vibration and medium frequency, medium amplitude vibration. This makes it difficult to provide sufficient damping action against engine shake and idling vibration.

To address this problem, the applicant has further proposed, as taught in JP-A-5-118375, to provide a working air chamber to the opposite side of the movable film from the pressure receiving chamber, whereby in association with negative pressure exerted on the working air chamber from the outside, the movable film is made to undergo constraining deformation, limiting the extent of elastic deformation thereof. Namely, by ensuring a sufficiently high level of fluid flow through the first orifice passage and second orifice passage during input of engine shake or idling vibration, by means of limiting the extent of elastic deformation of the movable film to suppress absorption of pressure fluctuations in the pressure receiving chamber, damping action of engine shake or idling vibration can be advantageously realized.

However, in the fluid-fluid engine mount disclosed in JP-A-5-118375, when limiting the extent of elastic deformation of the movable film, in consideration of phase difference, movable film free length, working air chamber size etc., negative pressure is exerted on the working air chamber, and the movable film undergoes a high level of undergo constraining deformation. This makes the mount control system and overall construction complicated. Thus, with the engine mount in question there are appreciable disadvantages in terms of production efficiency and production costs, another inherent problem is the difficult of installation in an automobile.

Further, the present applicant has made another proposal, while focusing on the fact that vibration which poses a problem in the high frequency range typically has small amplitude. Namely, as taught, for example, in JP-A-2000-310274 and JP-A-2001-200884, the present assignee has proposed to dispose a slightly displaceable removable plate extending at a generally right angle to the direction of opposition of the pressure receiving chamber and the equilibrium chamber with respect to a partition member, whereby pressure fluctuations produced in the pressure receiving chamber by input of vibration in the high-frequency band above the tuning frequency band of the first orifice passage and second orifice passage can be absorbed by minute displacement of the movable plate, producing a low dynamic spring rate.

Where this kind of movable plate was employed, however, there was a risk that pressure fluctuations produced in the pressure receiving chamber would be absorbed by displacement of the movable plate, even during input of vibration in the low- to medium-frequency range, Specifically, vibration in the medium-frequency range, such as idling, typically has small amplitude of ±0.1-0.25 mm. As regards vibration in the low-frequency range, such as engine shake that is a problem during driving, there is now required effective vibration damping not only of large amplitude on the order of ±1.0 mm such as occurs when driving over speed bumps or the like, which has been considered a problem for some time, but also of small amplitude on the order of ±0.1 mm occurring during normal driving. Thus, as regards vibration of the low- to medium-frequency range having relatively small amplitude, if pressure fluctuations in the pressure receiving chamber are absorbed through small displacement of the movable plate, there is a risk that that fluid flow level through the first orifice passage or second orifice passage will be insufficient to afford adequate vibration damping action.

SUMMARY OF THE INVENTION

It is an object of the present invention to provide a pneumatically controlled, fluid filled engine mount of simple construction advantageously affording damping action against multiple, wide frequency ranges, as well has having improved case of installation in an automobile.

It is another object of the present invention to provide a pneumatically controlled, fluid filled engine mount of novel construction which reduces or avoids markedly high dynamic spring rate in the high frequency range while adequately assuring vibration damping effect by a first orifice passage tuned to the low-frequency range and a second passage tuned to the medium-frequency range, and which exhibits effective vibration damping action against vibration of multiple and broad frequency ranges.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

The principle of the present invention provides a pneumatically switchable type fluid-filled engine mount, comprising: (a) a first mounting member attachable to one of a power unit side member and a vehicle body side member; (b) a second mounting member attachable to an other of the power unit side member and the vehicle body side member; (c) a rubber elastic body elastically connecting the first mounting member and the second mounting member; (d) a pressure receiving chamber partially defined by the rubber elastic body, filled with a non-compressible fluid, and subjected to input of vibration; (e) an equilibrium chamber partially defined by a flexible layer for readily permitting change in volume thereof, and filled with the non-compressible fluid; (f) a first orifice passage for fluid communication between the pressure receiving chamber and the equilibrium chamber, tuned to a low frequency range generally corresponding to engine shake; (g) a second orifice passage for fluid communication between the pressure receiving chamber and the equilibrium chamber, tuned to a medium frequency range generally corresponding to idling vibration; (h) a valve member for opening/closing the second orifice passage; (i) a pneumatic actuator operated by air pressure from the outside, for driving the valve member; (j) a movable partition member whose center portion constitutes a rigid center movable plate portion and whose outer peripheral portion constitutes a readily deformable outer peripheral rubber film portion, disposed so that an outer peripheral edge of the outer peripheral rubber film portion is supported fluid-tightly by the second mount portion, permitting displacement and deformation in the center movable plate portion and the outer peripheral rubber film portion, the movable partition member defining another part of the pressure receiving chamber; and (k) an intermediate equilibrium chamber formed on an opposite side of the movable partition member from the pressure receiving chamber with the movable partition member interposed between the intermediate equilibrium chamber and the pressure receiving chamber.

In the fluid filled engine mount constructed in accordance with the present invention, although the center portion of the movable partition member tends to readily deform in association with vibration input to the pressure receiving chamber owing to its location away from the outer peripheral edge supported by the second mounting member, by means of disposing a rigid center movable plate portion in the center portion, the extent of displacement of the movable partition member is held down appropriately. Additionally, by making the center portion of the movable partition member rigid, excessive deformation can be suppressed even where the movable partition member is large. Thus, during input of low- to medium-frequency vibration, for which it is desirable for effective pressure fluctuation to be produced in the pressure receiving chamber, liquid pressure absorption by the movable partition member can be held in check despite the small amplitude of input vibration down to a certain point, so that pressure fluctuations are effectively produced in the pressure receiving chamber.

Additionally, by disposing a readily deforming peripheral movable rubber film portion in the outer peripheral portion of the center movable plate portion, particularly when vibration in the high-frequency band is input to the pressure receiving chamber, the movable partition member, principally on the basis of deformation of the peripheral movable rubber film portion, undergoes displacement and deformation in response to the high-frequency vibration, so that pressure fluctuations in the pressure receiving chamber are advantageously suppressed.

In the fluid filled engine mount constructed in accordance with the present invention, during input of low frequency, large amplitude vibration such as engine shake produced by driving over a speed bump or step, there is prevented an associated absorption of liquid pressure by means of displacement and deformation of the movable partition member composed of a center movable plate portion and an outer peripheral rubber film portion. This produces effective pressure fluctuations within the pressure-receiving chamber, thereby enabling relative pressure fluctuations to be created between the pressure receiving chamber and the equilibrium chamber. Thus, the second orifice passage is maintained in the closed state by the valve member, ensuring an adequate level of fluid flow through the first orifice passage, so as to achieve a high level of attenuating effect based on flow action (e.g. resonance action) of the fluid induced to flow through the first orifice passage, so that excellent vibration damping ability is exhibited.

When low frequency, small amplitude vibration corresponding to engine shake etc. produced, during normal driving, for example, by means of the fact that the outer peripheral rubber film portion assures a fluid tight seal at the outer peripheral side of the center movable plate portion, and the fact that the center movable plate portion is rigid so as to suppress the extent of deformation of the movable partition member, absorption of pressure of the pressure receiving chamber by the movable partition member is suppressed, whereby sufficiently effective pressure fluctuations are produced in the pressure receiving chamber. Thus, as in the case of low frequency, large amplitude vibration mentioned previously, as long as the second orifice passage is in the closed state by the valve member, an adequate level of fluid flow through the first orifice passage is effectively assured, and a high level of attenuating effect based on flow action (e.g. resonance action) of the fluid induced to flow through the first orifice passage to achieved, so that excellent vibration damping ability is exhibited.

Further, during input of high frequency, small amplitude vibration corresponding for example to booming noise produced during driving, since pressure fluctuations in the pressure receiving chamber are extremely small, pressure fluctuations in the pressure receiving chamber can be reduced based on displacement and deformation of the movable partition member. In particular, by having the center movable plate portion of the movable partition member formed in the center portion, effective surface area on the part of the center movable plate portion 19 effectively assured. Additionally, since outer peripheral rubber film portion which provides fluid-tight support at the outer peripheral edge of the movable partition member is readily deformable, the member can undergo displacement and deformation in association with high frequency vibration in the pressure receiving chamber, effectively suppressing pressure fluctuations of the pressure receiving chamber. Thus, when vibration in the high frequency band is input, even if the first and second orifice passages are in a substantially closed state, marked pressure fluctuations of the pressure receiving chamber can be avoided by means of the movable partition member, and by means of effective vibration isolating action based on low dynamic spring characteristics, excellent vibration damping or isolating action may be achieved. For instance, when a natural frequency of the movable partition member is tuned to a high frequency band corresponding to a running booming noise, the movable partition member more likely undergoes displacement or deformation on the basis of its resonance action, further effectively preventing pressure fluctuation induced in the pressure receiving chamber.

Additionally, during input of medium frequency, medium amplitude vibration corresponding for example to idling vibration etc. occurring with the vehicle at a stop, absorption of pressure of the pressure receiving chamber by the movable partition member is a concern. However, since the extent of deformation of the movable partition member is suppressed on the basis of the rigid center movable plate portion disposed in the center portion of the movable partition member, and since, due to the fact that the outer peripheral rubber film portion is provided on the outer peripheral side of the center movable plate portion ensuring a fluid tight seal of the pressure receiving chamber, pressure leakage from the pressure receiving chamber to the equilibrium chamber is avoided. Thus, adequate pressure fluctuations can be created in the pressure-receiving chamber. With the second orifice passage being placed in the open state by operation of the pneumatic actuator, an adequate level of fluid flow through the second orifice passage can be adequately assured, whereby a high level of attenuating effect based on flow action (e.g. resonance action) of fluid induced to flow through the second orifice passage is achieved, so that excellent vibration damping ability is exhibited. With the second orifice passage in the open state, the first orifice passage is in the open state as well. However, during input of medium frequency vibration in a frequency range above of the tuning frequency of the first orifice passage, the first orifice passage becoming substantially closed due to anti-resonant action of fluid through the first orifice passage, the level of fluid flow through the second orifice passage will be effectively assured.

That is, the fluid filled engine mount of the present invention employs the movable partition member comprising the center movable plate portion and the outer peripheral rubber firm portion. With this arrangement, in response to input of high frequency, very small amplitude vibration of the kind described previously for example, liquid pressure absorbing action on the part of the movable partition member can be made to function effectively. Thus, high dynamic spring on the part of the pressure receiving chamber can be suppressed to achieve excellent vibration isolating effect. While in response to low frequency, small amplitude vibration and medium frequency, small medium vibration for example, the extent of deformation of the movable partition member is suppressed and fluid tightness of the pressure receiving chamber is assured, whereby effective pressure fluctuations are produced in the pressure receiving chamber. Thus, by selectively switching the second orifice passage between the closed and open states, vibration attenuating action based of fluid flow action through the orifice passages can be effectively achieved.

Thus, in this embodiment, by means of employing a movable partition member of the sort described above, the desired damping action of vibration of multiple, wide frequency ranges can be achieved by means of relatively simple construction, to effectively realize an engine mount with excellent production efficiency and cost performance.

Additionally, in the engine mount of the present invention, since there is no express need for a construction to control the level of displacement and deformation of the movable partition member depending on the vibration frequency being damped, the control system can be simplified, the process of installation in an automobile can be made easier, and operating costs pertaining to the mount can be advantageously reduced.

According to the first advantageous form of the invention, the intermediate equilibrium chamber comprises an aft chamber open to an atmosphere. With this arrangement, the intermediate chamber can be easily formed with simple construction.

According to the second advantageous form of the invention, the first mounting member is disposed at and spaced apart from a first axial open end of the second mounting member of cylindrical shape, with the first mounting member and the second mounting member being connected by the rubber elastic body to thereby fluid-tightly close the first axial open end of the second mounting member, and an other open end of the second mounting member is covered fluid-tightly by the flexible layer, while a partition member is disposed between the rubber elastic body and the flexible layer and supported by the second mounting member so that the pressure receiving chamber and equilibrium chamber are formed to either side of the partition member; wherein the movable partition member is disposed in the partition member on a side facing the pressure receiving chamber, and the intermediate equilibrium chamber is formed on a back side of the movable partition member remote from the pressure receiving chamber in the partition member, while an air passage is formed extending from the air chamber to an outer circumferential surface of the second mounting member through the partition member and the second mounting member; wherein the first orifice passage is formed so as to extend along an outer peripheral portion of the partition member in an circumferential direction, and the second orifice passage is formed so as to extend with a predetermined length in an axial direction at an outer peripheral side of the movable partition member in the partition member, and extend radially inwardly through an inner portion of the partition member, the second orifice passage being open to the pressure-receiving chamber through a fist opening formed at an outer peripheral side of the movable partition member in the partition member and being open to the equilibrium chamber through a second opening formed at a central portion of the partition member; and wherein the flexible layer is superimposed onto the second opening of the second orifice passage to constitute the valve member, the valve member being driven by the actuator to carry out opening/closing control of the second orifice passage by alternately opening and closing the second opening of the second orifice passage, and a second opening peripheral portion that extends outwardly in an axis-perpendicular direction from the second opening of the second orifice passage has a dilated shape of gradually increasing width dimension in the circumferential direction going outwardly in the axis-perpendicular direction.

In this embodiment, the first and second orifice passages are formed utilizing the partition member which divides the pressure receiving chamber and the equilibrium chamber, and the movable partition member and air chamber are disposed in the partition member. Thus, the members are functionally disposed, thereby realizing overall compact construction.

With the fluid filled engine mount of this advantageous form, the portion that extends outwardly in the axis-perpendicular direction from the second opening of the second orifice passage on the equilibrium chamber side is imparted with a dilated shape of gradually increasing width dimension in the circumferential direction going outwardly in the axis-perpendicular direction, whereby it is possible to maintain a good degree of freedom in design of the first orifice passage in the partition member, the air chamber, the movable partition member etc., while making it possible to ensure large capacity of the second orifice passage. Additionally, when vibration damping characteristics giving wise to effective pressure fluctuations are required of the pressure receiving chamber, even in instances where pressure absorption of the pressure receiving chamber is produced at a predetermined level by means of the movable partition member, since the second orifice passage has large capacity, a sufficiently large flow of fluid caused to flow through the second orifice passage is assured. Thus, the expected vibration damping effect (high damping effect) is obtained on the basis of flow action of fluid through the second orifice passage.

According to the third advantageous form of the invention, the intermediate equilibrium chamber is formed integrally with the equilibrium chamber so that the center movable plate portion and the peripheral movable rubber film portion undergo displacement and deformation on the basis of a pressure difference between the pressure receiving chamber formed on one side thereof and the equilibrium chamber formed on an other side thereof so as to absorb, by means of the displacement and deformation, pressure fluctuation in the pressure receiving chamber during input of vibration in a high frequency band corresponding to drive booming noise.

According to the fourth advantageous form of the invention, a portion of the equilibrium chamber is constricted to form a fluid passage, and the displacement and deformation of the movable partition member based on a pressure difference between the pressure receiving chamber and the equilibrium chamber, exerted on either face of the movable partition member permits a substantial fluid flow through the fluid passage.

This advantageous form ensures a large flow level of fluid induced to flow through the fluid passage on the basis of displacement and deformation of the movable partition member, whereby vibration damping action based on flow action, e.g. resonance action, of fluid through the fluid passage may be, advantageously achieved. Thus, by tuning the fluid passage to a particular frequency range of vibration to be tamped, vibration damping effect is exhibited advantageously over a wide range. Further, in this embodiment, since a portion of the equilibrium chamber is utilized in forming the fluid passage, sufficient passage length can be advantageously assured, without any accompanying increase in size of the mount as a whole.

According to the fifth advantageous form of the invention, the first mounting member is disposed at and spaced apart from a first axial open end of the second mounting member of cylindrical shape, with the first mounting member and the second mounting member being connected by the rubber elastic body to thereby fluid-tightly close the first axial open end of the second mounting member, and an other open end of the second mounting member is covered fluid-tightly by the flexible layer, while a partition member is disposed between the rubber elastic body and the flexible layer and supported by the second mounting member so that the pressure receiving chamber and equilibrium chamber are formed to either side of the partition member; wherein the movable partition member is displaceably and deformably disposed so as to extend at a generally right angle to the direction of opposition of the pressure receiving chamber and the equilibrium chamber in the partition wall member; and wherein the first orifice passage is formed so as to extend along an outer peripheral portion of the partition member in an circumferential direction, and the second orifice passage is formed so as to extend with a predetermined length in an axial direction at an outer peripheral side of the movable partition member in the partition member, and extend radially inwardly through an inner portion of the partition member, the second orifice passage being open to the pressure-receiving chamber through a first opening formed at an outer peripheral side of the movable partition member in the partition member and being open to the equilibrium chamber through a second opening formed at a central portion of the partition member; and wherein the flexible layer is superimposed onto the second opening of the second orifice passage to constitute the valve member, the valve member being driven by the actuator to carry out opening/closing control of the second orifice passage by alternately opening and closing the second opening of the second orifice passage.

In this embodiment, the first and second orifice passages are formed utilizing the partition wall member that divides the pressure receiving chamber and the equilibrium chamber, and the movable partition member is disposed, whereby the members are functionally situated so as realize a compact construction overall.

According to the sixth advantageous form of the invention, an elastic contact projection is formed projecting out from an outer peripheral edge portion of the center movable plate portion in the movable partition member, the elastic contact projection being positioned in contact against the second mounting member or a displacement restricting member supported by the second mounting member, thereby providing displacement limiting member for cushion-wise limitation of an extent of displacement of the center movable plate portion.

In this advantageous form, the displacement limiting member makes it possible to more effectively suppress absorption of pressure fluctuations of the pressure receiving chamber by the movable partition member, during input not only of low frequency, large amplitude vibration but also of low frequency, small amplitude vibration. This may increase the flow volume of fluid induced to flow through the first orifice passage, thereby improving damping action based on resonance action of the fluid, and vibration damping performance against low frequency vibration in association therewith. Further, since it is possible to adjust the support spring characteristics of the center movable plate portion by means of contact of the elastic contact projection against the second mounting member or the displacement restricting member, it becomes possible to adjust the characteristic frequency of the center movable plate portion to coincide with a high frequency vibration frequency range corresponding to driving booming noise, or the like. Additionally, the displacement restricting member contacted by the elastic contact projection can be advantageously constituted by being fixedly supported by means of the second mounting member. More specifically, it can be advantageously constituted by utilizing the aforementioned partition member which is fixedly supported by the second mounting member, and divides the pressure receiving chamber and the equilibrium chamber.

According to the seventh advantageous form of the invention, the pneumatic actuator is operable such that during driving of an automobile, the valve member is driven by generally atmospheric pressure applied from an outside whereby the second orifice passage assumes a closed state thereof, and when the automobile is at a stop the valve member is driven by negative pressure applied from the outside whereby the second orifice passage assumes an open state.

This advantageous form makes it possible to switch the second orifice passage between open/closed states by skillfully utilizing the negative pressure from an air intake system of the automobile's internal combustion engine. Also, in this embodiment, in association with switching the second orifice passage between open/closed states simply through application of positive/negative air pressure and control of same to the pneumatic actuator, various types of vibration damping performance can be exhibited selectively, whereby simplified control overall can be advantageously achieved.

According to the eighth advantageous form of the invention, a rigid constriction plate is disposed in the center movable plate portion of the movable partition member, with the outer peripheral rubber film portion being bonded to the constriction plate.

In this embodiment, the constriction plate makes it possible to more reliably suppress absorption of pressure fluctuations of the pressure receiving chamber during low- to medium-frequency vibration input due to unwanted deformation of the center movable plate portion. With this arrangement, it is possible to more effectively and consistently achieve desired vibration damping action based on flow action, e.g. resonance action, of fluid induced to flow through the fist orifice passage and second orifice passage. The constriction plate will preferably consist of a thin plate of rigid synthetic resin material, metal, or the like. It is possible for the center movable plate portion to consist of the constriction plate only, with the peripheral movable rubber film portion bonded to the outer peripheral edge thereof. Alternatively, it is possible to bond the constriction plate to the center portion of a rubber elastic film that extends over substantially the entire center movable plate portion to form the center movable plate portion in the center portion of the rubber elastic film, with the peripheral movable rubber film portion being formed by the outer peripheral edge of the rubber elastic film.

According to the ninth advantageous form of the invention, displacement and deformation characteristics of the movable partition member are designed so that, in the event that input vibration applied across the first mounting member and the second mounting member is very small amplitude vibration of ±0.05 mm or less, pressure fluctuations produced in the pressure receiving chamber can be substantially absorbed; whereas in the event that input vibration applied across the first mounting member and the second mounting member is small amplitude vibration of about ±0.1 mm or large amplitude vibration of ±1.0 mm or more, pressure fluctuations produced in the pressure receiving chamber cannot be substantially absorbed.

This advantageous form of the invention makes it possible to effectively achieve excellent vibration-damping action against a variety of vibrations that are typically a problem for most automobiles, while differing by model. Namely, the present engine mount is capable of exhibiting excellent vibration damping performance through high damping action for (1) low-frequency, large-amplitude vibration in a low-frequency range of around 10 Hz and large amplitude on the order of ±1.0 mm, such as by engine shake etc. caused by driving over a speed bump or the like, and (2) low-frequency, small-amplitude vibration in a low-frequency range of around 10 Hz and small amplitude on the order of ±0.1 mm, such as engine shake which is a problem during normal driving, while exhibiting excellent vibration damping performance through low dynamic spring constant or characteristics against (3) booming noise and other high-frequency vibration which is a problem during normal driving, falling in a high-frequency range of from 50 Hz to several hundred Hz and very small amplitude of ±0.05 mm or less. Design displacement and deformation characteristics on the part of the movable partition member in the manner described above can be advantageously achieved, for example, by tuning the characteristic frequency of the movable partition member to a frequency range of very small amplitude of ±0.05 mm or less, and utilizing the resonance action of the movable partition member; or by employing the displacement restricting member in the aforementioned fifth advantageous form of the invention.

As will be apparent from the preceding description, since the pneumatically switchable type fluid filled engine mount of construction in accordance with the present invention employs a movable partition member composed of a center movable plate portion and an outer peripheral rubber film portion, the desired vibration-damping capabilities against vibration of multiple, wide frequency ranges may be achieved with a relatively simple construction, and production efficiency and cost performance may be advantageously improved. Additionally, the overall control system may be simplified, whereby the procedure of installation in an automobile may be made easier, and operating costs may be advantageously reduced.

Further, since the pneumatically switchable type fluid filled engine mount of construction in accordance with the present invention employs the movable partition member composed of a center movable plate portion and an outer peripheral rubber film portion, vibration-attenuating effect against low- or medium-frequency vibration is advantageously achieved based on resonance action of fluid through the first or second orifice passage, and vibration isolating effect against high-frequency vibration is advantageously achieved based on liquid pressure absorbing action of the movable partition member, whereby the desired vibration-damping capabilities against vibration of multiple, broad frequency ranges may be advantageously achieved.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
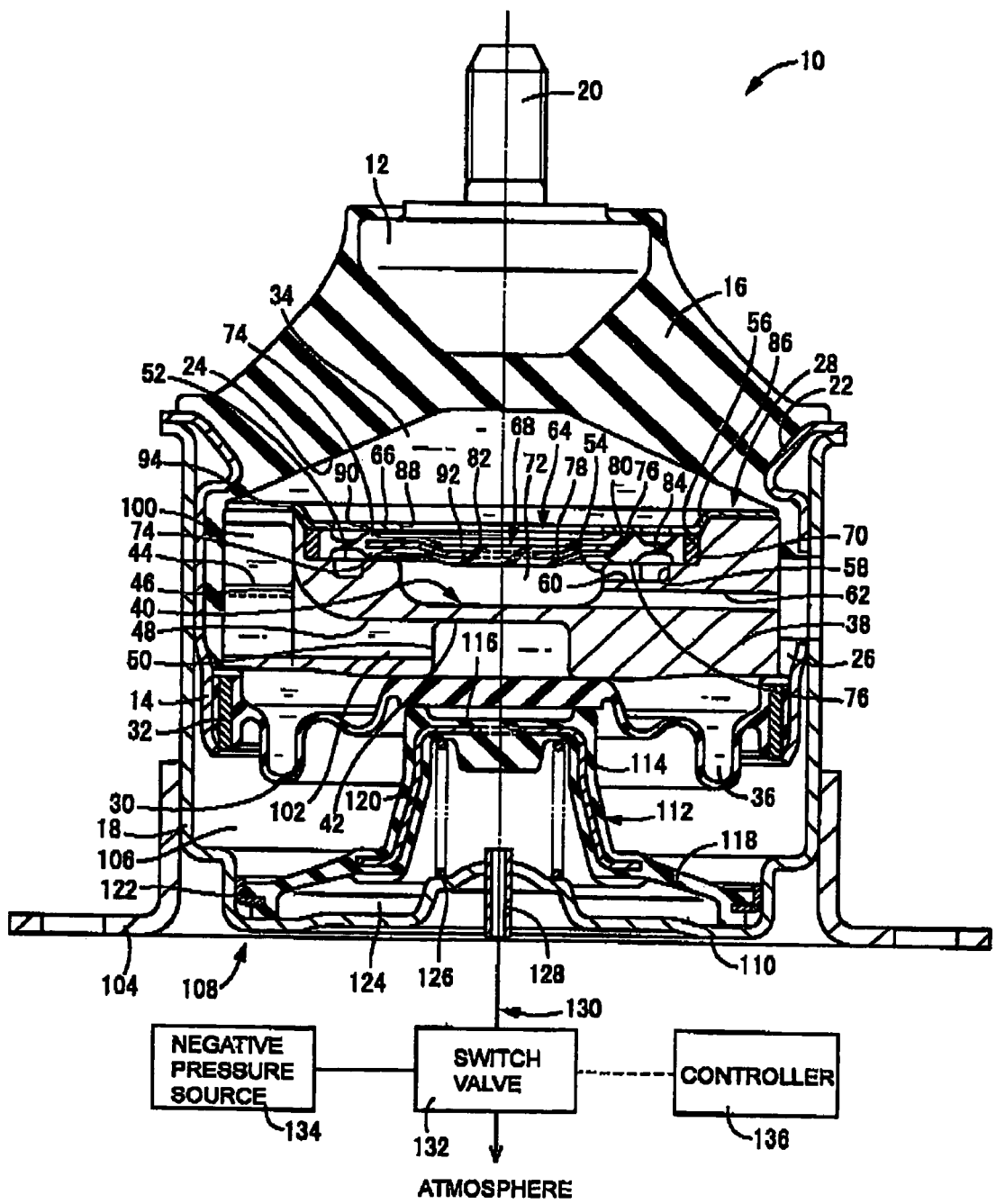
FIG. 1 is a vertical cross sectional view of a fluid-filed engine mount of construction according to a first embodiment of the invention, taken along line 1-1 of FIG. 2.

The preferred embodiments of the invention are described in detail hereinbelow with reference to the accompanying drawings, in order to provide a more specific understanding of the invention. Referring first to FIG. 1, there is illustrated an automotive vibration damping engine mount 10 as an embodiment of the invention. This engine mount 10 has a construction wherein a first mounting member in the form of a first mount fitting 12, and a second mounting member in the form of a second mount fitting 14, are elastically connected by means of a rubber elastic body 16, with the first mount fitting 12 attached to the power unit side, and the second mount fitting 14 attached to the vehicle body side, to support the power unit of the body in a vibration-damped manner. In the description hereinbelow, vertical direction shall refer to the vertical direction in FIG. 1.

To describe in more detail, the first mount fitting 12 has a block shape of generally inverted truncated cone form. A mount bolt 20 is integrally formed on the large-diameter end face thereof, projecting upward in the axial direction.

The second mount fitting 14, on the other hand, has a large-diameter, generally cylindrical shape overall. The second mount fitting 14 has a necked portion 22 at is upper axial end. This necked portion 22 recesses inwardly in the diametrical direction and extends about the entire circumference in the circumferential direction. By means of the necked portion 22, the open end at the upper axial end of the second mount fitting 14 is given an inverted taper shape that expands gradually moving upward. The first mount fitting 12 is disposed generally coaxially with the second mount fitting 14, while being spaced apart from the necked portion 22 of the upper open end thereof. The rubber elastic body 16 is disposed between the first mount fitting 12 and the second mount fitting 14 with these fittings being elastically coupled by means of the rubber elastic body 16.

The rubber elastic body 16 has a generally truncated cone shape overall, with the first mount fitting 12 inserted into the rubber elastic body 16 from the small-diameter end thereof and bonded by vulcanization thereto. The open end portion at the axial upper end of the second mount fitting 14 overlaps the outside peripheral face of the large-diameter end of the rubber elastic body 16 and is vulcanization bonded thereto. With this arrangement, the tapered outer peripheral face of the first mount fitting 12 and the inverted taper shaped inner peripheral face of the necked portion 22 of the second mount fitting 14 are positioned in opposition to one another, with the rubber elastic body 16 interposed between the opposed faces. In this embodiment, the rubber elastic body 16 is an integrally vulcanization molded component comprising the first mount fitting 12 and the second mount fitting 14.

With the outside peripheral wall of the rubber elastic body 16 bonded by vulcanization to the opening of the second mount fitting 14, the opening on the axial upper end of the second mount fitting 14 is provided with fluid-tight closure by the rubber elastic body 16. On the large-diameter end of the rubber elastic body 16 there is formed a large-diameter recess 24 of cone shape, opening into the second mount fitting 14.

A seal rubber layer 26 is formed covering the inner peripheral face of the second mount fitting 14. This seal rubber layer 26 is integrally formed with the rubber elastic body 16, and substantially the entire inner peripheral face of the second mount fitting 14 is covered by the seal rubber layer 26.

A partition member 28 and a rubber diaphragm 30 serving as the flexible layer are fitted in sequence into the second mount fitting 14 from the opening at the bottom axial end, and fastened fitting within the second mount fitting 14. A cylindrical fastening cylinder fitting 32 is vulcanization bonded to the outer peripheral edge of the rubber diaphragm 30, and this fastening cylinder fitting 32 is fastened fitting within the lower mount of the second mount fitting 14 to provide fluid-tight closure to the lower opening of the second mount fitting 14.

By means of this arrangement, to one side of the partition member 28 (the upper side in FIG. 1), there is formed a pressure receiving chamber 34 whose wall is partially composed of the rubber elastic body 16. To the other side of the partition member 28 (the lower side in FIG. 1), there is formed an equilibrium chamber 36 whose wall is partially composed of the rubber diaphragm 30. The pressure receiving camber 34, and the equilibrium chamber 36 have sealed therein a non-compressible fluid such as water, an alkylene glycol, a polyalkylene glycol, silicone oil, or the like. In the pressure receiving chamber 34 positive pressure fluctuations are produced on the basis of elastic deformation of the rubber elastic body 16 when vibration is input, whereas in the equilibrium chamber 36, deformation of the rubber diaphragm 30 is readily allowed so that capacity is variable, whereby pressure fluctuations can be absorbed promptly.

Figure 2:
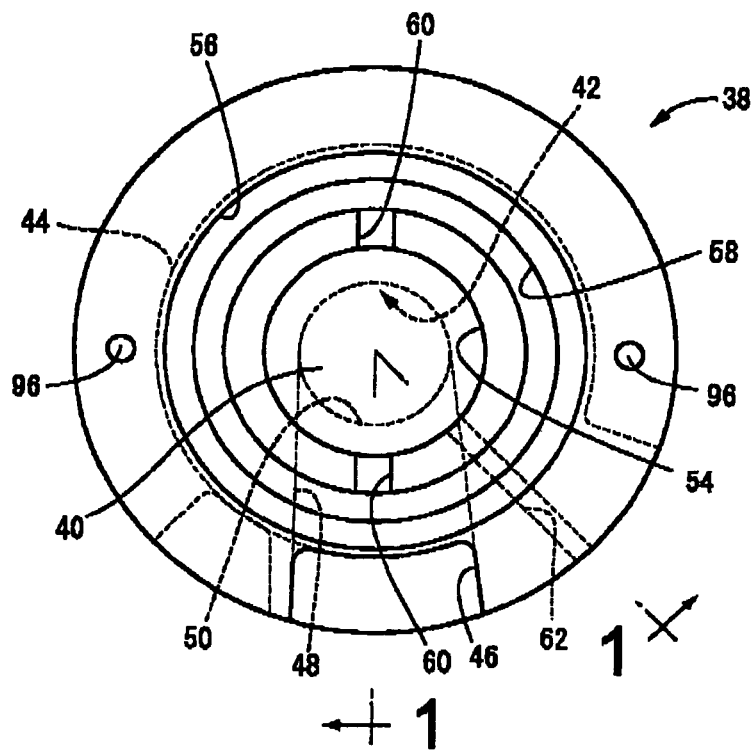
FIG. 2 is a top plane view of a partition member of the engine mount of FIG. 1.
Figure 3:
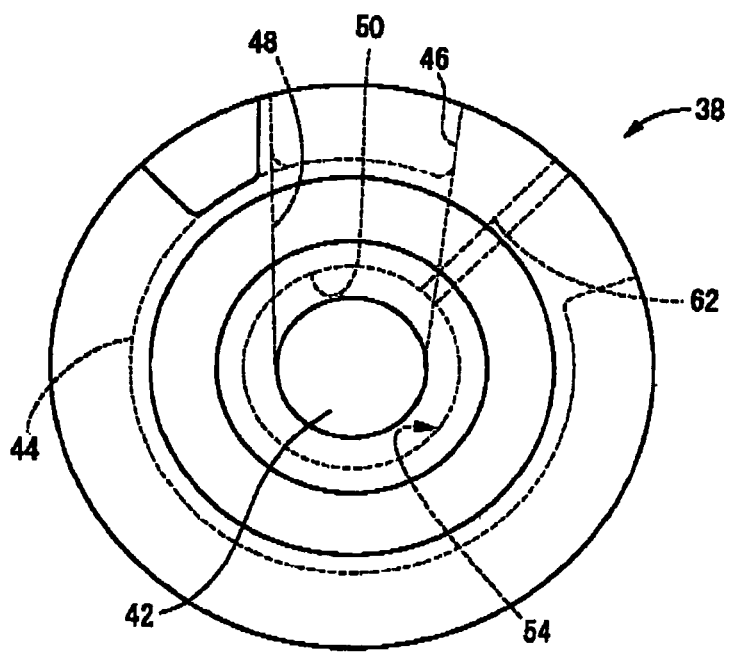
FIG. 3 is a bottom plane view of the partition member of FIG. 2.
Figure 4:
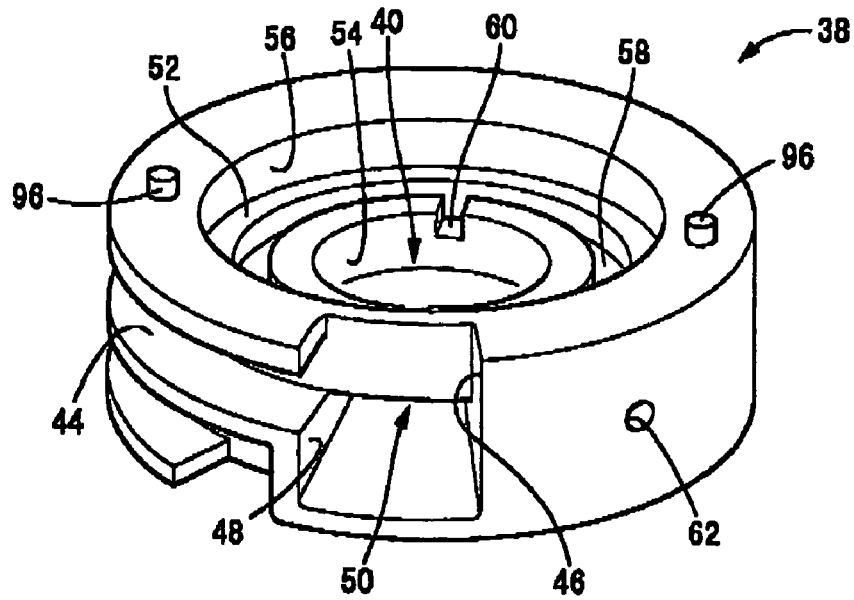
FIG. 4 is a perspective view of the partition member of FIG. 2.

As shown in FIGS. 2-4, the partition member 28 comprises a divider block 38 having a thick, generally disk shape. The divider block 38 has formed respectively in the center portions of its upper end face and lower end face an upper central recess 40 and a lower central recess 42, each with the form of a generally circular depression.

In the divider block 38 is also formed a circumferential groove 44 that opens onto the outer peripheral face of the divider block 38 and that extends in the circumferential direction. Each of the two ends of this circumferential groove 44 open in the face of the divider block 38 on one side in the axial direction. Also formed in the divider block 38 is an axial groove 46 that opens onto the outer peripheral face of the divider block 38 and that extends in a straight line over a predetermined distance in the axial direction. The upper end of this axial groove 46 utilizes one end of the circumferential groove 44 to open in the upper face of the divider block 38.

The lower end of the axial groove 46 connects to the lower central recess 42 through a connecting hole 48 that extends in a tunnel configuration in the diametrical direction. That is, the connecting hole 48 at its first end opens into the lower central recess 42 through an opening 50 of rectangular shaped in a side view, which is formed in the center portion of the divider block 38. The other end of the connecting hole 48 opens onto the outer peripheral face of the divider block 38 via the open and of the axial groove 46.

In this embodiment in particular, the width dimension of the connecting hole 48 in the circumferential direction increases gradually going outwardly in the diametrical direction (axis-perpendicular direction) from the opening 50 connected to the lower central recess 42 towards the outer peripheral face of the partition member 28. By means of this design, the cross sectional area in the connecting hole 48 in the diametrical direction extending from the opening 50 towards the axial groove 46 is given a shape that becomes gradually larger in the circumferential direction or width dimension moving diametrically outward from the opening 50.

Additionally, the upper central recess 40 of the divider block 38 is provided in the depth wise medial portion thereof with a stopped face 52, thereby forming a stepped circular recess composed of a small-diameter recess portion 54 towards the floor end and a large-diameter recess portion 56 towards the opening end. An annular recess 58 of generally ring shape seen in plan view is formed extending continuously around the entire circumferential direction of the axially medial portion. The annular recess 58 connects to the small-diameter recess 54 through connector slots 60 formed at several locations (two locations in this embodiment) in the inner peripheral wall. Also formed in the peripheral wall of the small-diameter recess 54 is an air passage 62 extending through the divider block 38 in the diametrical direction. The inside end of this air passage 62 communicates with the small-diameter recess 54, while the outside end of the air passage 60 opens to the outside at the outer peripheral face of the divider block 38.

A movable member 64 serving as the movable partition member is assembled with the large-diameter recess portion 56. From the top of the movable member 64, a cover plate fitting 66 is assembled overlapping the upper face of the divider block 38.

Figure 5:
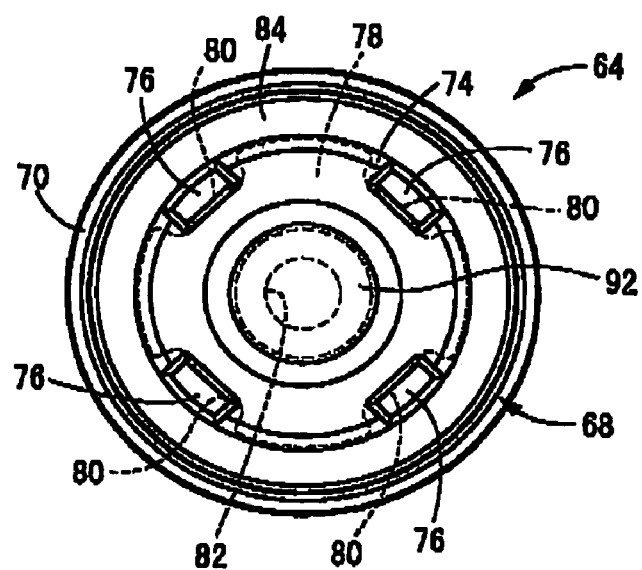
FIG. 5 is a top plane view of a movable member of the engine mount of FIG. 1.
Figure 6:
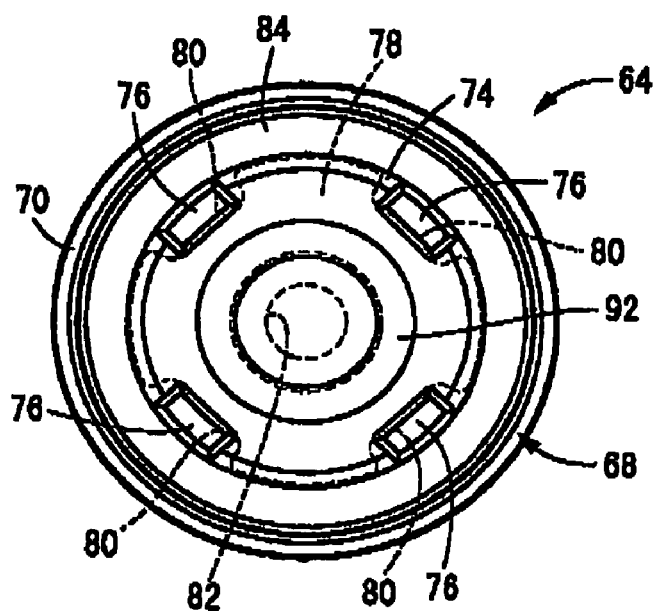
FIG. 6 is a bottom plane view of the movable member of FIG. 5.

As illustrated in the single component diagrams in FIGS. 5 and 6, the movable member 64 has a rubber elastic plate 68 of circular, generally thin plate shape, with a circular mating fitting 70 vulcanization bonded to the outer peripheral face of this rubber elastic plate 68. The mating fitting 70 is secured press-fit into the large-diameter recess portion 56 of the divider block 38, whereby the upper central recess 40 is provided with fluid-tight closure by the movable member 64, thus forming the pressure receiving chamber 34 above the movable member 64 on the one band, while forming an air chamber 72 below the movable member 64. The air chamber 72 normally communicates with the atmosphere via the air passage 62 formed in the divider block 38, and through-holes formed passing through the peripheral wall of the second mount fitting 14 and a bracket 18.

The rubber elastic plate 68, in a portion thereof situated generally at the inner peripheral edge of the stepped face 52 of the divider block 38, has an integrally formed annular elastic projection 74 that extends continuously or discontinuously in the circumferential direction. At several locations on the circumference of the elastic projection 74 (four locations in this embodiment) are integrally formed contact support portions 76 of generally trapezoid configuration that project appreciably from the upper and lower faces. In this embodiment, the distal edge-to-edge dimension of elastic projection 74, 74 is designed to be slightly smaller than the axial dimension of the mating fitting 70, and the distal edge-to-edge dimension of the contact support portions 76, 76 is designed to be the same as or slightly larger than the axial dimension of the mating fitting 70.

Figure 7:
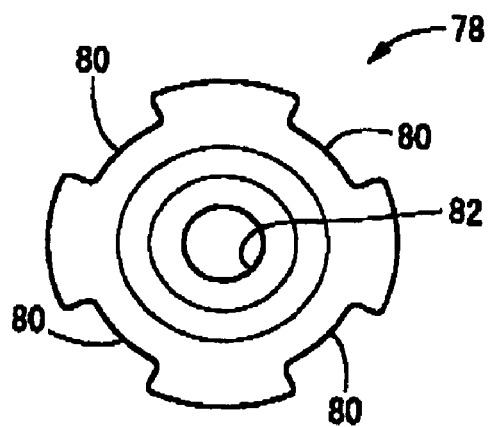
FIG. 7 is a top plane view of a constriction plate of the engine mount of FIG. 1.

A rigid constriction plate 78 consisting of metal or synthetic resin is embedded in the center portion of the rubber elastic plate 68. As shown in FIG. 7, this constriction plate 78 is of generally shallow dish shape whose center portion is slightly recessed, and while thin, provides improved deformation rigidity. The constriction plate 78 has an outside diameter dimension larger than the inside diameter dimension of the upper central recess 40 of the divider block 38, with the outer peripheral edge of the constriction plate 78 extending out to the stepped face 52.

A notch 80 is formed at each of several locations on the outer peripheral edge of the constriction plate 78 corresponding to the upper and lower contact support portions 76, 76 to provide clearance at the locations where the contact support portions 76, 76 are formed when the constriction plate 78 is covered by the rubber elastic plate 68. The center of the constriction plate 78 is perforated by circular hole 82 and covered by the rubber material making up the movable member 64. Forming this circular hole 82 affords good distribution of rubber material onto both faces of the constriction plate 78 and also improves bond strength of the rubber to the constriction plate 78. By adjusting the size of the circular hole 82 and the thickness dimension of the rubber film closing off the circular hole 82, it is possible to appropriately adjust the elastic deformation characteristics of the movable member 64.

The outer peripheral portion of the rubber elastic plate 68 is made thin in the portion situated between the elastic projection 74 and the mating fitting 70. By means of this design, an outer peripheral movable rubber film portion 84 is formed with an annular disk configuration extending over predetermined width in the circumferential direction. This outer peripheral movable rubber film portion 84 is positioned on the opting of the annular recess 58 formed at the stepped face 52 of the divider block 38.

Figure 8:
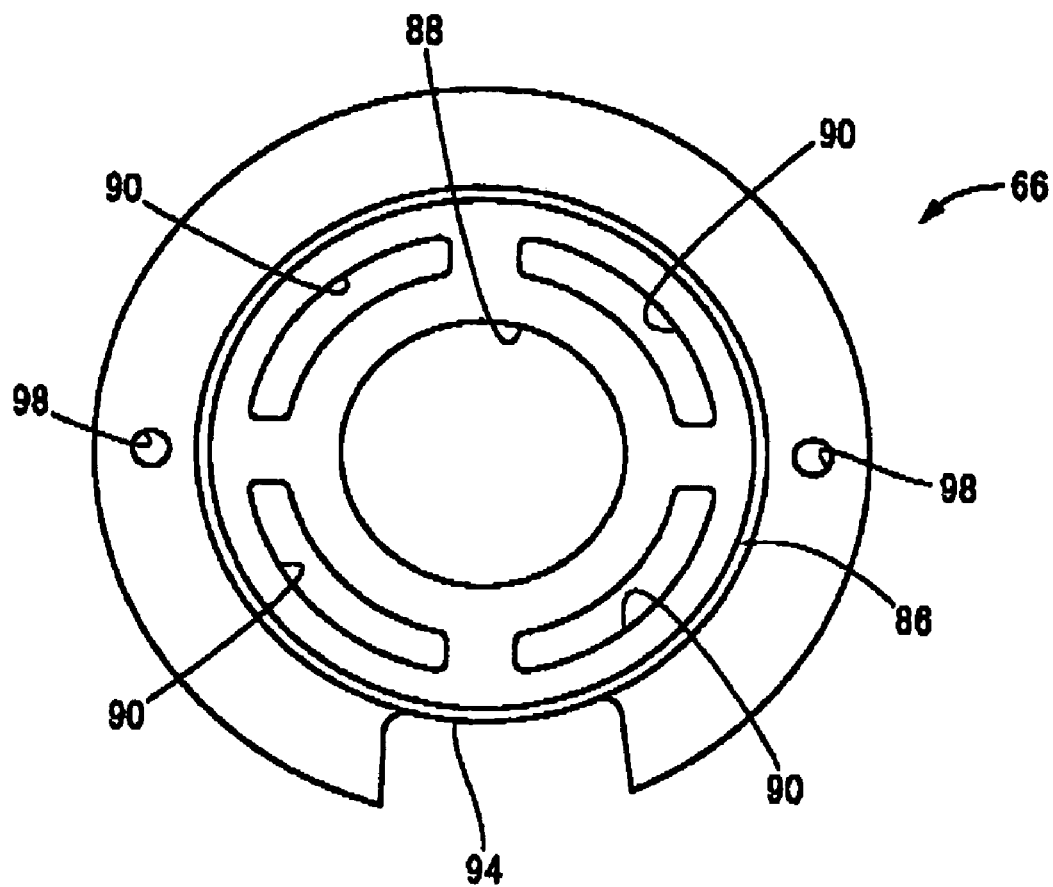
FIG. 8 is a top plane view of a cover plate fitting of the engine mount of FIG. 1.

On the other hand, as shown in FIG. 8, the cover plate fitting 66 has the overall form of a thin, generally disk shaped member having a slight stepped portion 86 formed in the diametrically medial portion, and has a center portion projecting downward with respect to the outer peripheral edge portion. The cover plate fitting 66 is superposed onto the upper face of the divider block 38, and the stepped portion 86 is fitted into the opening of the upper central recess 40 of the divider block 38 to attach it positioned in the diametrical direction.

A round center through-hole 88 is formed in the center portion of the cover plate fitting 66, and around this center through-hole 88 are formed a number of outer peripheral through-holes 90 that extend a predetermined width in the circumferential direction. When the cover plate fitting 66 is installed on the divider block 38, a center movable plate portion 92 of the rubber elastic plate 68 reinforced by the constriction plate 78 faces the pressure receiving chamber 34 through the center through-hole 88, and the outer peripheral movable rubber film portion 84 faces the pressure receiving chamber 34 through the outer peripheral through-holes 90.

A notched window 94 is provided at single circumferential location on the outer peripheral edge of the cover plate fitting 66, this notched window 94 being positioned aligned with the upper opening shared by the circumferential groove 44 and the axial groove 46 provided to the divider block 38. In order to position the notched window 94 and grooves 44, 46 aligned with one another, a positioning projection 96 is disposed at an appropriate location on the circumference of the upper end face of the divider block 38, and a positioning hole 98 is formed at a corresponding location on the cover plate fitting 66, with positioning in the circumferential direction being realized through the mating action of the positioning projection 96 and the positioning hole 98.

Figure 9:
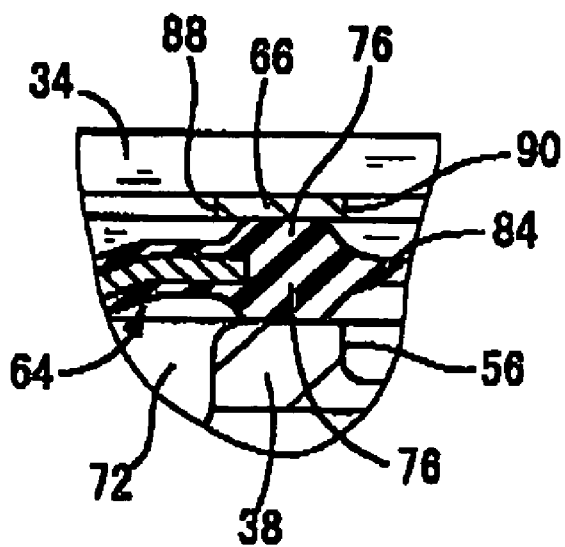
FIG. 9 is an enlarged fragmentary view in vertical cross section of a part of the engine mount of FIG. 1.
Figure 10:
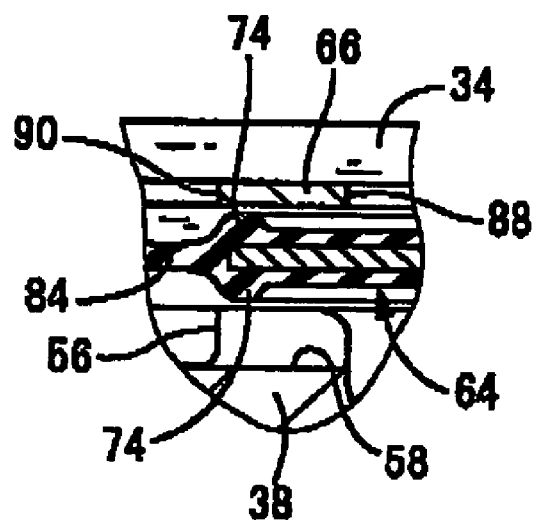
FIG. 10 is an enlarged fragmentary view in vertical cross section of another part of the engine mount of FIG. 1.

With the aforementioned rubber elastic plate 68 and cover plate fitting 66 attached to the divider block 38, as shown in enlarged view in FIG. 9, the contact support portions 76 of the rubber elastic plate 68 are disposed with the distal end faces thereof contacting the stepped face 52 of the divider block 38 or the lower face of the cover plate fitting 66, and appropriately compressed where necessary. As shown in enlarged view in FIG. 10, the elastic projection 74 is positioned across a slight gap from the stopped face 52 of the divider block 38 or the lower face of the cover plate fitting 66. When a pressure fluctuation of the pressure receiving chamber 34 is exerted against the rubber elastic plate 68, the rubber elastic plate 68 undergoes displacement and deformation on the basis of the pressure difference between the pressure receiving chamber 34 and the air chamber 72 exerted across the upper and lower faces of the rubber elastic plate 68. In this embodiment, the elastic projection 74 functions as an elastic contact projection and is brought into contact against a displacement restricting member in the form of the cover plate fitting 66, thereby providing displacement limiting member for cushion-wise limitation of an extent of displacement of the center movable plate portion 92.

With this arrangement, deformation of the center movable plate portion 92 of the rubber elastic plate 68 is limited by the constriction plate 78 embedded therein. Thus, the displacement will be occurred principally based on elastic deformation of the contact support portions 76, 76. The outer peripheral movable rubber film portion 84 is thin and readily allows elastic deformation, so that displacement is produced due to this deformation. The space of the back of the center movable plate portion 92 and the space to the back of the outer peripheral movable rubber film portion 84 are consistently maintained in a communicating state by the connector slots 60, and function substantially like a single air chamber. In this embodiment, the intermediate equilibrium chamber is constituted by this air chamber.

The openings of the circumferential groove 44 and the axial groove 46 formed on the outside peripheral face of the divider block 38 are each provided with fluid-tight closure by the second mount fitting 14. By providing closure to the circumferential groove 44, there is formed a first orifice passage 100 connecting the pressure receiving chamber 34 and the equilibrium chamber 36 to one another. This passage is normally in the open state. By providing closure to the axial groove 46, there is formed a second orifice passage 102 that passes from the connecting hole 48 to the lower central recess 42 of the divider block 38, and opens into the equilibrium chamber 36 to connect the equilibrium chamber 36 to the pressure receiving chamber 34.

This second orifice passage 102 is formed with approximately the same passage cross sectional area as the first orifice passage 100, but shorter passage length. By means of this design, the second orifice passage 102 is tuned to a higher frequency range than the first orifice passage 100. Specifically, the resonance frequency of fluid caused to flow through the first orifice passage 100 is tuned so as to exhibit, on the basis of resonance action of the fluid, high damping characteristics against engine shake or other low-frequency, small-amplitude vibration on the order of ±0.1 mm and 10 Hz, and engine shake or other low-frequency, large-amplitude vibration on the order of ±1.0 mm and 10 Hz, for example. The resonance frequency of fluid caused to flow through the second orifice passage 102 is tuned so as to exhibit, on the basis of resonance action of the fluid, low dynamic spring constant against idling vibration or other medium-frequency, medium amplitude vibration on the order of ±0.1-0.25 mm and 20-40 Hz, for example. The characteristic frequency of die movable member 64, based on displacement and deformation of the movable member 64, is tuned so that the movable member 64 is effectively made to produce resonance phenomenon against driving booming noise or other high-frequency, very small amplitude vibration on the order of ±0.01-0.02 mm and 60-120 Hz, for example.

In this embodiment in particular, since the diametrical cross sectional area of the connecting hole 48 that constitutes part of the second orifice passage 102 gradually expands in the circumferential direction going diametrically outward from the opening 50 formed in the center portion of the divider block 38, the capacity of the second orifice passage 102 is greater than the capacity of a second orifice passage imparted with a structure of straight shape over the entire length thereof that extends with a generally constant size diametrically outward from the opening.

As described above, the mount body is formed by attaching the partition member 28 and rubber diaphragm 30 to the integrally vulcanization molded component of the rubber elastic body 16 having the first mount fitting 12 and the second mount fitting 14. To this mount body, there is additionally attached a bracket 18. The bracket 18 has a large-diameter, deep-bottomed generally bottomed cylindrical shape overall, and is fastened fitting onto the exterior of the second mount fitting 14. The bracket 18 is then secured press-fit into a cylindrical fastener fitting 104 having a large-diameter, generally cylindrical shape, the cylindrical fastener fitting 104 being bolted to the vehicle body, whereby the second mount fitting 14 is mounted onto the vehicle body by means of the bracket 18.

The bracket 18 is sufficiently deep-bottomed relative to the second mount fitting 14, and with the second mount fitting 14 secured fitting therein, there is formed an internal space 106 of sufficient size located in the lower portion of the bracket 18. By means of this internal space 106 the rubber diaphragm 30 is permitted to undergo bulging deformation to a sufficiently large extent.

Also disposed in the lower portion of the bracket 18 is a pneumatic actuator 108. This pneumatic actuator 108 utilizes the floor of the bracket 18 as a base housing 110, and is attached to the base housing 110 so that an output member 112 serving as the valve member is positioned inside the bracket 18.

The output member 112 comprises a divider rubber 114 of generally hat shape overall, with the center portion of the divider rubber 114 constituting an output portion 116 of inverted cup shape, and with the outer peripheral portion constituting a tapered, flange shaped elastic peripheral wall portion 118 that flares downward on the diagonal from the rim at the lower end of the output portion 116. The output portion 116 has embedded therein a rigid reinforcing member 120 formed of metal or synthetic resin, while an annular press-fitting fixture 122 is bonded by vulcanization to the outer peripheral edge of the peripheral wall portion 118.

By press fitting the press-fitting fixture 122 against the bottom peripheral wall of the bracket 18, the outer peripheral edge of the divider rubber 114 is placed in fluid-tight contact against the bottom face of the base housing 110 formed by the bracket 18. With this arrangement, the opening of the output member 112 is provided closure by the bottom wall of the base housing 110 to constitute a pneumatic actuator 108 with a pressure regulating air chamber 124 formed inside.

In this embodiment, a compressed coil spring 126 is attached accommodated within the pressure regulating air chamber 124 so that urging force is normally exerted in the direction pushing the output portion 116 and the base housing 110 apart from one another. An air port 128 passes through the center of the floor of the base housing 110. Pressure in the pressure regulating air chamber 124 can be controlled from the outside through this air port 128.

With the engine mount 10 installed, an external air pressure line 130 is connected to the air port 128, and a switch valve 132 is connected via the air pressure line 130. In accordance with switching operation of the switch valve 132, the pressure regulating air chamber 124 is selectively connected to the atmosphere or a negative pressure source 134.

With the pressure regulating air chamber 124 connected to the atmosphere, by means of the action of the elastic behavior of the elastic peripheral wall portion 118 and the elastic behavior of the compressed coil spring 126 on the output portion 116, the output portion is caused to project resiliently upward, urging the rubber diaphragm 30 upward and holding it pressed against the center lower face of the divider block 38 in the partition member 28. Since the contour of the output portion 116 is larger than the opening diameter of the lower central recess 42 formed on the center lower face of the divider block 38, the center portion of the rubber diaphragm 30 is pushed against the opening of the lower central recess 42 and provides substantially fluid-tight closure thereto, whereby the second orifice passage 102 which opens into the equilibrium chamber 36 through the lower central recess 42 is closed off.

On the other hand, with the pressure regulating air chamber 124 connected to the negative pressure source 134, on the basis of the pressure differential between outside atmospheric pressure and the negative pressure exerted inside the pressure regulating air chamber 124, the output portion 116 is drawn into the pressure regulating air chamber 124 in opposition to the elastic behavior of the elastic peripheral wall portion 118 and the elastic behavior of the compressed coil spring 126, causing it to become displaced axially downward. Thus, the rubber diaphragm 30 separates from the opening of the lower central recess 42, opening the second orifice passage 102 and placing it in the open state.

In this embodiment, the switch valve 132 is switched by the controller 136 according to whether the vehicle is driving or at a stop. That is, during driving, the pressure regulating air chamber 124 is connected to the atmosphere, whereas when at a stop, the pressure regulating air chamber 124 is connected to the negative pressure source 134. The controller 136 is advantageously constituted so as to output a drive control signal to an electromagnetic solenoid constituting the switch valve 132, by means of an acceleration sensor or the like.

Accordingly, in the engine mount 10 of the construction described above, low frequency, large amplitude vibration input when driving over a speed bump or the like is not accompanied by absorption of liquid pressure through displacement and deformation of the movable member 64 comprising the center movable plate portion 92 and the outer peripheral movable rubber film portion 84, so that effective pressure fluctuation is produced in the pressure receiving chamber 34. By means of this, a relative pressure fluctuation between the pressure receiving chamber 34 and the equilibrium chamber 36 is effectively produced. Thus, as long as the second orifice passage 102 is maintained in the closed state by the output member 112, fluid flow volume through the first orifice passage 100 is advantageously assured, a high level of damping effect based on flow action, e.g. resonance action, of the fluid induced to flow through the first orifice passage 100 is exhibited, and excellent vibration damping ability is achieved.

In response to low frequency, small-amplitude vibration input during normal driving, as with the low frequency, large-amplitude vibration described earlier, as long as the second orifice passage 102 is maintained in the closed state by the output member 112, fluid flow volume through the first orifice passage 100 is advantageously assured, a high level of attenuating effect based on flow action, e.g. resonance action, of the fluid induced to flow through the first orifice passage 100 is exhibited, and excellent vibration damping ability is achieved. While pressure absorption of the pressure receiving chamber 34 by the movable member 64 is a concern, in this embodiment, the fact that fluid-tightness at the outer peripheral side of the center movable plate portion 92 is assured by the outer peripheral movable rubber film portion 84, and the fact that the extent of deformation of the movable member 64 is suppressed by the rigidity of the center movable plate portion 92, mean that adequate pressure fluctuations are created in the pressure receiving chamber 34.

Since pressure fluctuations of the pressure receiving chamber 34 in response to high-frequency, very small amplitude vibration input during driving are extremely small, the pressure fluctuations of the pressure receiving chamber 34 are effectively absorbed and lessened by means of displacement and deformation of the movable member 64. In particular, since the center movable plate portion 92 of the movable member 64 can be formed in the center portion to advantageously assure effective surface area, whereas the outer peripheral edge portion thereof is constituted as fluid-tightly supported, readily deformable outer peripheral movable rubber film portion 84, following displacement in response to high frequency pressure fluctuations in the pressure receiving chamber 34 can advantageously be achieved, and pressure fluctuations in the pressure receiving chamber 34 can be suppressed. Additionally, since the characteristic frequency of the movable member 64 is tuned to the high frequency range of vibration to be damped, when high frequency vibration is input, the movable member 64 more advantageously undergoes following displacement on the basis of resonance action. Thus, when high frequency vibration is input, even with the first and second orifice passages 100, 102 in substantially closed states, sharp pressure fluctuations in the pressure receiving chamber 34 can be avoided by the movable member 64, and excellent vibration damping action may be achieved by means of effective vibration isolating action based on low dynamic spring characteristics.

Further, in response to medium-frequency, medium-amplitude vibration input with the vehicle at a stop, while pressure absorption of the pressure receiving chamber 34 by the movable member 64 is a concern, in this embodiment, since the extent of deformation of the movable member 64 is suppressed on the basis of the rigid center movable plate portion 92 disposed in the center portion of the movable member 64, and since the outer peripheral movable rubber film portion 84 is disposed to the outside of the center movable plate portion 92 ensuring that the pressure receiving chamber 34 is fluid-tight, adequate pressure fluctuations are created in the pressure receiving chamber 34. Thus, by means of operation of the pneumatic actuator 108 placing the second orifice passage 102 in the open state, an adequate level of fluid flow through the second orifice passage 102 can be adequately assured, whereby high damping effect based on flow action, e.g. resonance action, of the fluid induced to flow through the second orifice passage 102 is achieved, and excellent vibration damping ability is exhibited. Additionally, with the second orifice passage 102 in the open state, the first orifice passage 100 is in the open state as well, but since medium-frequency input vibration of a frequency range above of the tuning frequency of the first orifice passage 100 will be countered by the first orifice passage 1100 becoming substantially closed due to antiresonant action of fluid through the first orifice passage 100, the level of fluid flow through the second orifice passage 102 is effectively assured.

Accordingly, in the engine mount 10 of this embodiment, the first orifice passage 100, second orifice passage 102, and movable member 64 each function efficiently in response to the frequency and amplitude of vibration to be damped, whereby effective vibration damping action is exhibited against vibration of multiple, wide frequency ranges.

In the embodiment, by employing a movable member 64 that comprises a center movable plate portion 92 and an outer peripheral movable rubber film portion 84, when a mode requiring suppression of liquid pressure absorption of the pressure receiving chamber 34 by the movable member 64 so that pressure fluctuations are effectively produced in the pressure receiving chamber 34, e.g. during input of low-frequency, small-amplitude vibration or medium-frequency, medium-amplitude vibration as described previously, based on the fact that the extent of deformation of the movable member 64 is suppressed by the rigid center movable plate portion 92 formed in the center of the movable member 64, and the fact that fluid-tightness to the outside of the center movable plate portion 92 is assured by the outer peripheral movable rubber film portion 84, effective pressure fluctuations are produced in the pressure receiving chamber 34. Thus, since adequate fluid flow levels through the first orifice passage 100 or second orifice passage 102 are assured, by selectively switching the second orifice passage 102 between the open state and the closed state, vibration damping effect based on fluid flow action through the orifice passages 100, 102 can be advantageously achieved.

As a result, even in the absence of a construction whereby, for example, air pressure from the outside (either negative pressure or positive pressure) is exerted to cause the movable member 64 to undergo constricting deformation and suppress the liquid pressure absorbing action thereof, the desired vibration damping effect can nevertheless be achieved on the basis of suppressing the extent of deformation and displacement by means of the construction of the movable member 64 so that pressure fluctuations are effectively produced in the pressure receiving chamber 34. Thus, the overall structure can be realized functionally, production efficiency can be advantageously improved, and the construction of the switch valve 132, the controller 136, the air pressure line 130 etc. can be simplified, thereby advantageously reducing production costs and operating costs, as well as simplifying installation in an automobile.

In this embodiment, by giving the connecting hole 48 that constitutes part of the second orifice passage 102 a flaring shape whose width dimension in the circumferential direction increases gradually going diametrically outward from the opening 50 formed in the center portion of the divider block 38, large capacity on the part of the second orifice passage 102 is assured. As a result, in situations where vibration damping characteristics involving effective pressure fluctuations being produced in the pressure receiving amber 34 are required, even in the event that a predetermined level of pressure absorption of the pressure receiving chamber 34 by the movable member 64 is produced, an adequately high level of flow of fluid caused to flow through the second orifice passage 102 is assured, whereby the desired vibration damping effect (high damping effect) is exhibited on the basis of flow action of fluid through the second orifice passage 102.

Additionally, in this embodiment, by forming the elastic projection 74 and the contact support portions 76 as elastic contact projections on the movable member 64, the extent of displacement of the movable member 64 can be limited, more effectively suppressing pressure absorption by the movable member 64 during input of low-frequency, small-amplitude vibration.

In the engine mount 11 of this embodiment, since the constriction plate 78 is secured embedded in the center movable plate portion 99 of the movable member 64, it is possible to more reliably suppress absorption of pressure fluctuations of the pressure receiving chamber 34 during low- to medium-frequency vibration input due to unwanted deformation of the center movable plate portion 92, whereby vibration damping action based on flow action in the first orifice passage and second orifice passage is effectively exhibited.

Figure 11:
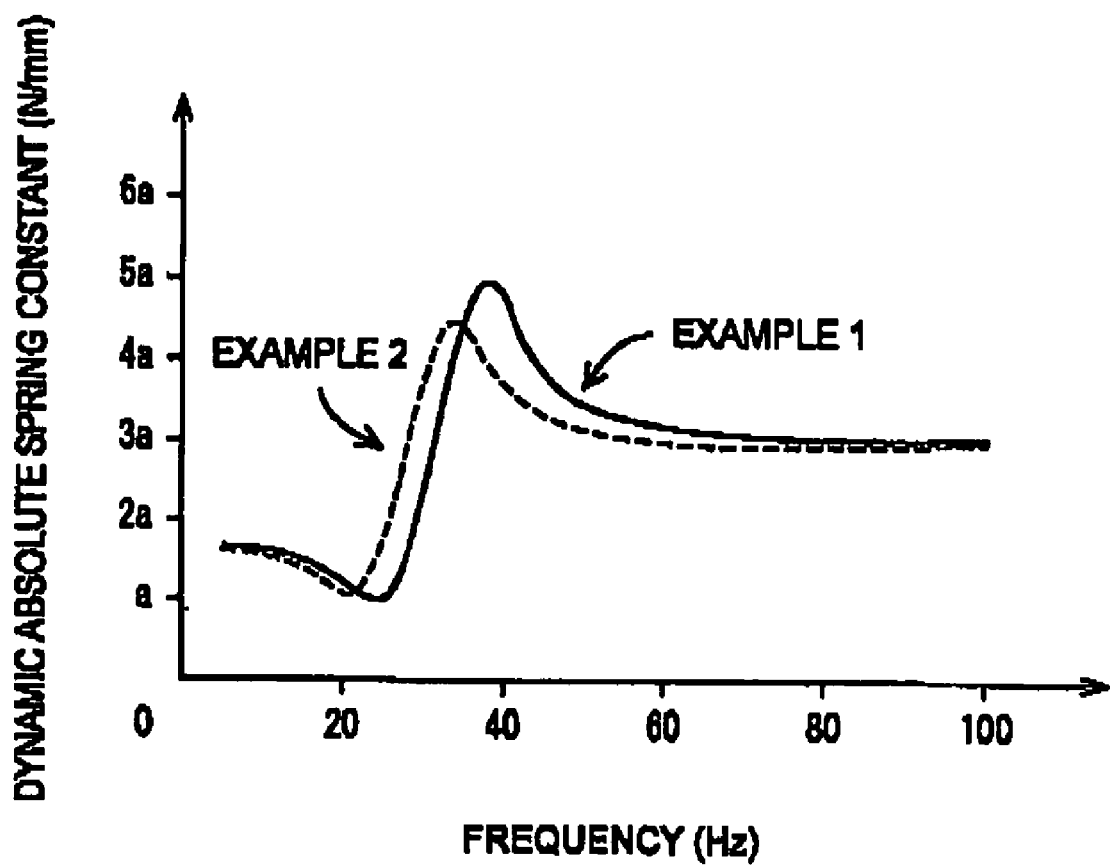
FIG. 11 is a graph showing measurements of dynamic characteristics of the engine mount of FIG. 1 (Example 1), and measurements of dynamic characteristics of the engine mount of FIG. 1 with the second orifice passage of different construction (Example 2)

Results of actual measurements of the frequency characteristics of vibration damping ability (dynamic absolute spring constant) taken for the engine mount 10 constructed according to the embodiment hereinabove are presented in the graph of FIG. 11 as Example 1. Frequency characteristics of vibration damping ability, measured in the same way as for Example 1, but for a engine mount (not shown) constructed with a straight shape over its entire length by means of extending the diametrical cross sectional area of the connecting hole constituting part of the second orifice passage with generally constant size diametrically outward from the opening formed in the center portion of the divider block, are also shown in FIG. 11, as Example 2. In Example 1, the diametrical cross sectional area of the opening of extended rectangular shape in side view, which opens onto the outside peripheral face of the divider block 38 in the connecting hole 48, is 225 mm$^2$, whereas in Example 2 it is 147 mm$^2$. In Example 1, the passage length extending diametrically outward from the opening 50 of the second orifice passage 102, to the opening which opens onto the outside peripheral face of the divider block 38 is 40 mm, whereas in Example 2 it is 41 mm. With this arrangement, the capacity of the second orifice passage 102 pertaining to Example 1 is larger than the capacity of the second orifice passage 102 pertaining to Example 2. During measurement, a static initial load of 1000 N equivalent to the distributed support load of a power unit was applied across the first mount fitting 12 and the second mount fitting 14, and vibration of 0.25 mm amplitude (displacement) approximating engine shake (small amplitude) and idling was applied.

As will be apparent from the results shown in FIG. 11, in the engine mounts pertaining to Examples 1 and 2, in response to vibration in a medium-frequency range of 20-40 Hz, which is one of the vibration frequency ranges needing to be damped, resonance phenomenon of the sealed fluid effectively occurs in each, and sufficient improvement in vibration damping ability based on resonance action or other flow action of the fluid could be expected in the vibration frequency range in question.

It will also be apparent from the results in FIG. 11 that the engine mount 10 pertaining to Example 1 was found to more advantageously exhibit high attenuating action against vibration in the medium-frequency range as compared to the engine mount pertaining to Example 2, leading to the conclusion that vibration damping ability in the frequency range was improved on the basis of ensuring large capacity on the part of the second orifice passage 102.

While the present invention has been described in detail in its presently preferred embodiments, for illustrative purpose only, it is to be understood that the invention is by no means limited to the details of the illustrated embodiments, but may be otherwise embodied. It is also to be understood that the present invention may be embodied with various changes, modifications and improvements which may occur to those skilled in the art, without departing from the spirit and scope of the invention.

For example, in the embodiment hereinabove, the center movable plate portion 92 is reinforced by embedding a rigid constriction plate 78, but the constriction plate 78 could be dispensed with. Specifically, by making the rubber elastic plate 68 thicker as necessary to impart sufficient rigidity to it, it becomes possible to exhibit functionality as the center movable plate portion 92, even without being reinforced by the constriction plate 78.

Also, whereas in the embodiment hereinabove a compressed coil spring 126 is used as the urging means for pushing against the opening of the lower central recess 42, the urging means is not limited to that taught in the embodiment. Specifically, it would be possible to instead simply utilize the elastic behavior of the divider rubber 114 to maintain a state of contact, or to use a plate spring or the like instead of a compressed coil spring 126.

The shape, size, and construction of the center movable plate portion 92 and the outer peripheral movable rubber film portion 84 in the movable member 64, as well as the placement location of the movable member 64 with respect to the partition member 28, are not limited to those taught herein by way of example, and may be modified appropriately depending on the required vibration damping characteristics, produce-ability, and other considerations. For example, whereas in the embodiment hereinabove the outer peripheral edge of the movable member 64 is supported fluid-tightly on the second mount fitting 14 through the agency of the partition member 28, by means of press-fitting the mating fitting 70 vulcanization bonded thereto against the partition member 28, it would be acceptable instead, rather than attaching a mating fitting (70) to the outer peripheral edge of the movable member 64, to arrange the outer peripheral edge rubber portion forming the outer peripheral edge portion of the movable member 64 so that it is clamped fluid-tightly in the axial direction, thereby fixedly attaching the outer peripheral edge portion of the movable member 64 to the second mount fitting 14 via the partition member 28 if necessary.

Additionally, whereas in the embodiment hereinabove the diametrical cross sectional area of the connecting hole 48 extending from the opening 50 towards the axial groove 46 is of flared shape that gradually increases in size in the circumferential direction going from the opening 50 towards the axial groove 46, i.e. going diametrically outward, the axial sectional area of the connecting hole 48 could be given a flared shape that gradually increases in size in the axial direction going diametrically outward, instead of or in addition to the increasing diametrical sectional area of the connecting hole 48.

Further, whereas the embodiment hereinabove describes application of the invention in an automotive engine mount by way of a specific example, the invention could of course be implemented advantageously in non-automotive engine mounts as well.

Figure 12:
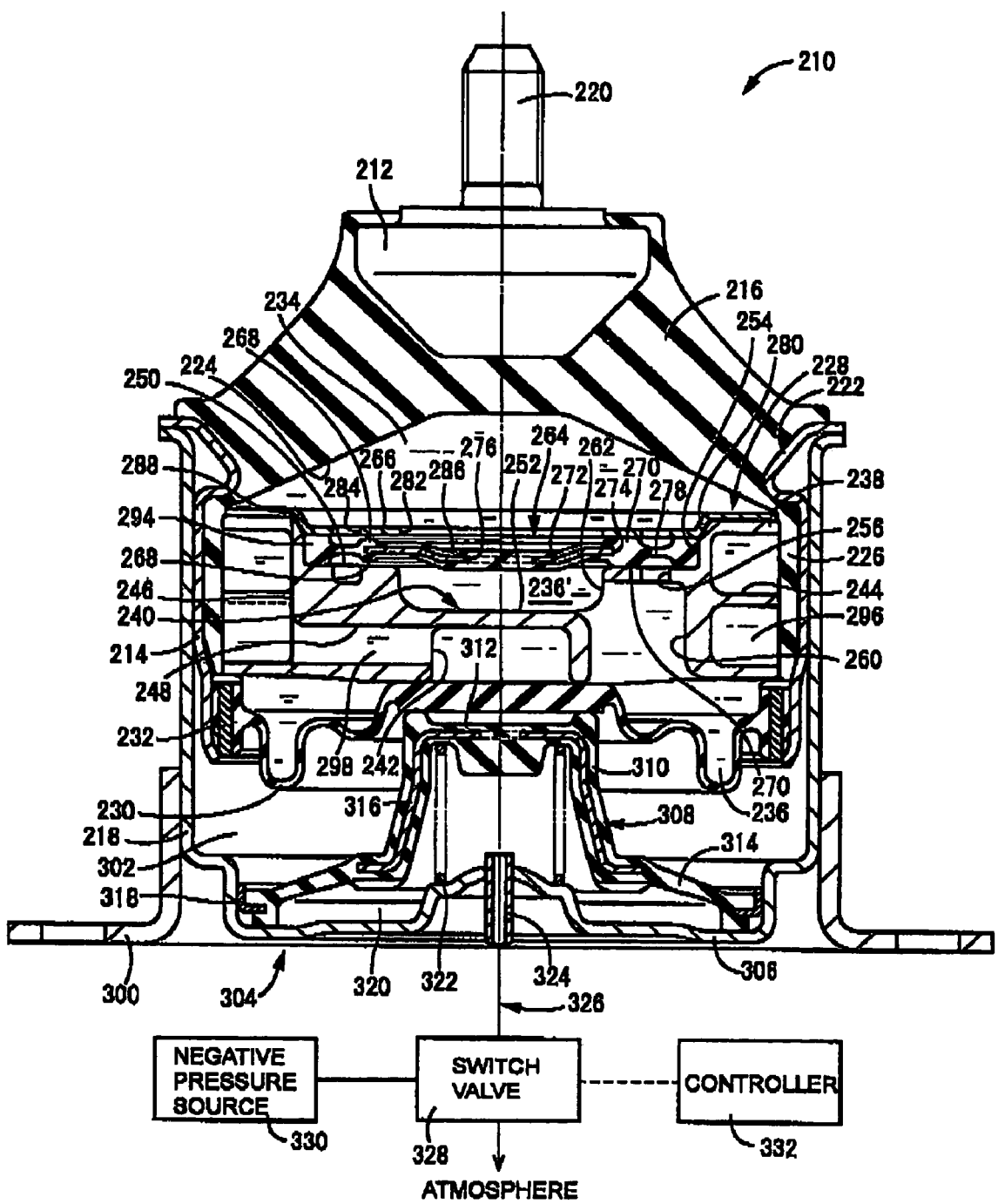
FIG. 12 is a vertical cross sectional view of a fluid-filled engine mount of construction according to a second embodiment of the invention, taken along line 12-12 of FIG. 13.

Referring next to FIG. 12, there is illustrated an automotive vibration damping engine mount 210 as an embodiment of the invention. This engine mount 210 has a construction wherein a first mounting member in the form of a first mount fitting 212, and a second mounting member in the form of a second mount fitting 214, are elastically connected by means of a rubber elastic body 216, with the first mount fitting 212 attached to the power unit side, and the second mount fitting 214 attached to the vehicle body side, to support the power unit of the body in a vibration-damped manner. In the description hereinbelow, vertical direction shall refer to the vertical direction in FIG. 12.

To describe in more detail, the first mount fitting 212 has a block shape of generally inverted truncated cone form. A mount bolt 220 is integrally formed on the large-diameter end face thereof, projecting upward in the axial direction.

The second mount fitting 214, on the other hand, has a large-diameter, generally cylindrical shape overall. The second mount fitting 214 has a necked portion 222 at is upper axial end. This necked portion 222 recesses inwardly in the diametrical direction and extends about the entire circumference in the circumferential direction. By means of the necked portion 222, the open end at the upper axial end of the second mount fitting 214 is given an inverted taper shape that expands gradually moving upward. The first mount fitting 212 is disposed generally coaxially with the second mount fitting 214, while being spaced apart from the necked portion 222 of the upper open end thereof. The rubber elastic body 216 is disposed between the first mount fitting 212 and the second mount fitting 214 with these fittings being elastically coupled by means of the rubber elastic body 216.

The rubber elastic body 216 has a generally truncated cone shape overall, with the first mount fitting 212 inserted into the rubber elastic body 216 from the small-diameter and thereof and bonded by vulcanization thereto. The open end portion at the axial upper end of the second mount fitting 214 overlaps the outside peripheral face of the large-diameter end of the rubber elastic body 216 and is vulcanization bonded thereto. With this arrangement, the tapered outer peripheral face of the first mount fitting 212 and the inverted taper shaped inner peripheral face of the necked portion 222 of the second mount fitting 214 are positioned in opposition to one another, with the rubber elastic body 216 interposed between the opposed faces. In this embodiment, the rubber elastic body 216 is an integrally vulcanization molded component comprising the first mount fitting 212 and the second mount fitting 214.

With the outside peripheral wall of the rubber elastic body 216 bonded by vulcanization to the opening of the second mount fitting 214, the opening on the axial upper end of the second mount fitting 214 is provided with fluid-tight closure by the rubber elastic body 216. On the large-diameter end of the rubber elastic body 216 there is formed a large-diameter recess 224 of cone shape, opening into the second mount fitting 214.

A seal rubber layer 226 is formed covering the inner peripheral face of the second mount fitting 214. This seal rubber layer 226 is integrally formed with the rubber elastic body 216, and substantially the entire inner peripheral face of the second mount fitting 214 is covered by the seal rubber layer 226.

A partition member 228 and a rubber diaphragm 230 serving as the flexible layer are fitted in sequence into the second mount fitting 214 from the opening at the bottom axial end, and fastened fitting within the second mount fitting 214. A cylindrical fastening cylinder fitting 232 is vulcanization bonded to the outer peripheral edge of the rubber diaphragm 230, and this fastening cylinder fitting 232 is fastened fitting within the lower mount of the second mount fitting 214 to provide fluid-tight closure to the lower opening of the second mount fitting 214.

By means of this arrangement, to one side of the partition member 228 (the upper side in FIG. 12), there is formed a pressure receiving chamber 234 whose wall is partially composed of the rubber elastic body 216. To the other side of the partition member 228 (the lower side in FIG. 12), there is formed an equilibrium chamber 236 whose wall is partially composed of the rubber diaphragm 230. The pressure receiving chamber 234 and the equilibrium chamber 236 have sealed therein a non-compressible fluid such as water, an alkylene glycol, a polyalkylene glycol, silicone oil, or the like. In the pressure receiving chamber 234 positive pressure fluctuations are produced on the basis of elastic deformation of the rubber elastic body 216 when vibration is input, whereas in the equilibrium chamber 236, deformation of the rubber diaphragm 230 is readily allowed so that capacity is variable, whereby pressure fluctuations can be absorbed promptly.

Figure 13:
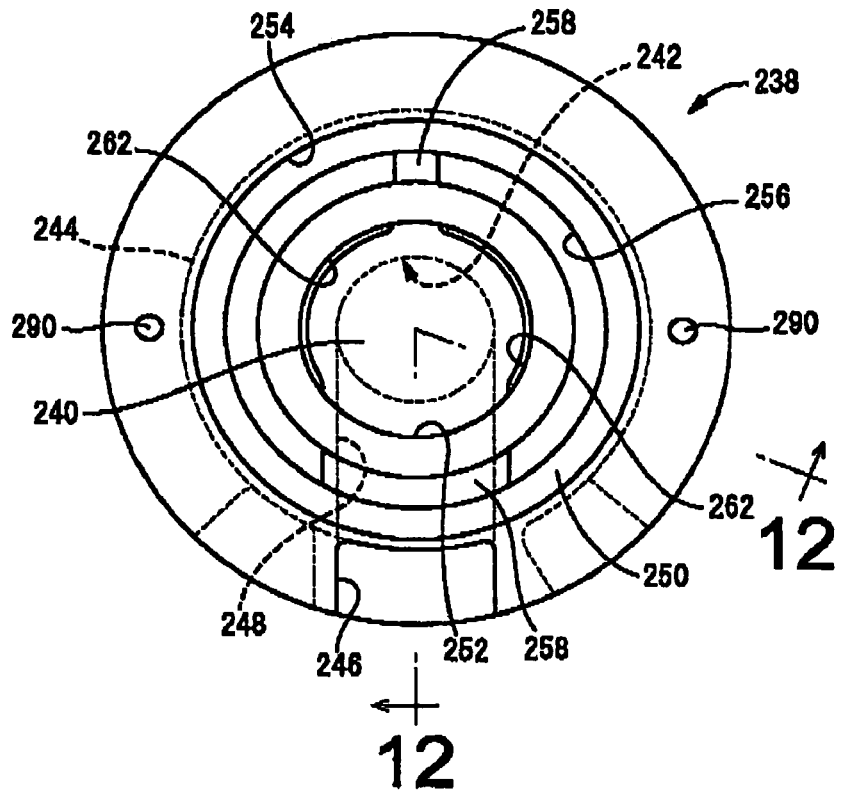
FIG. 13 is a top plane view of a partition member of the engine mount of FIG. 12.
Figure 14:
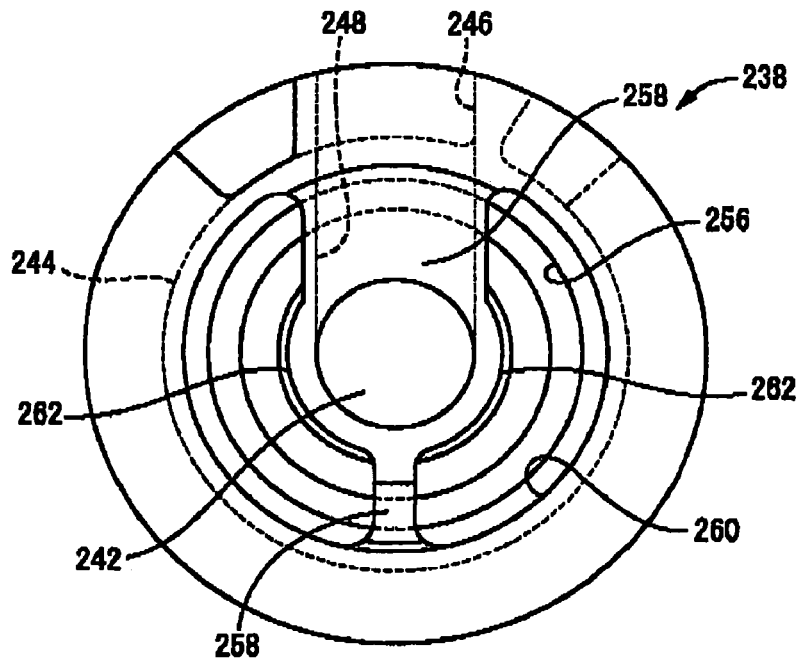
FIG. 14 is a bottom plane view of the partition member of FIG. 13.
Figure 15:
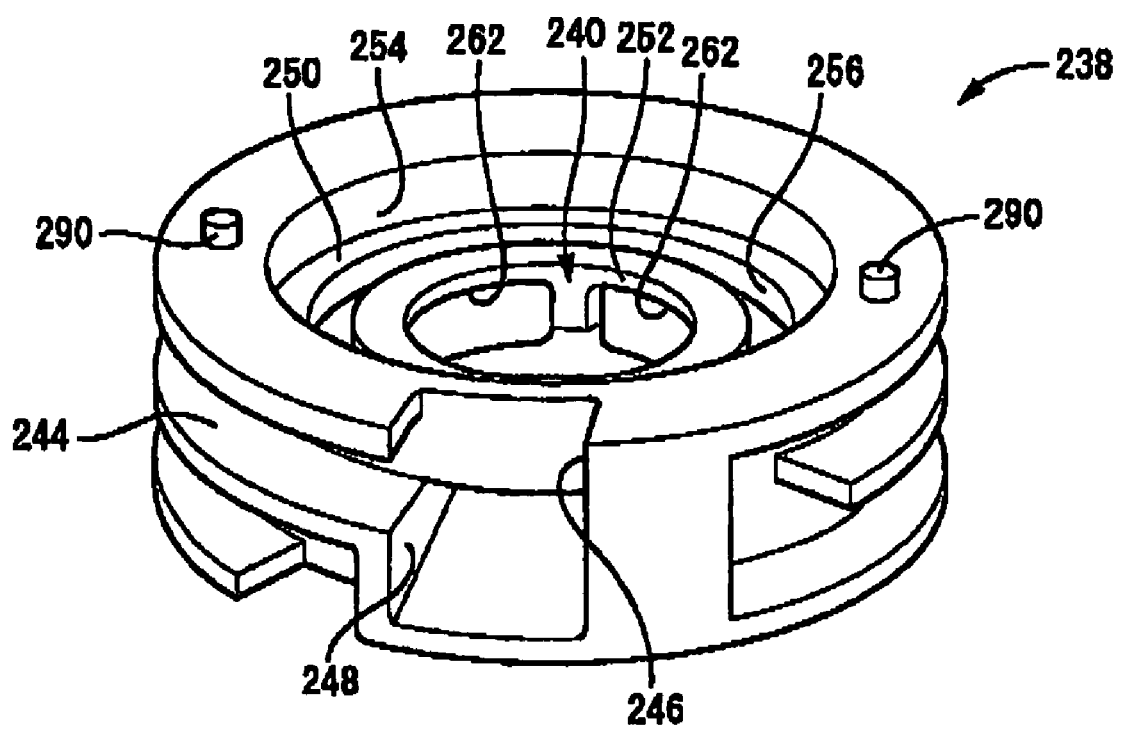
FIG. 15 is a perspective view of the partition member of FIG. 13.

As shown in FIGS. 13-15, the partition member 228 comprises a divider block 238 having a thick, generally disk shape. The divider block 238 has formed respectively in the center portions of its upper end face and lower end face an upper central recess 240 and a lower central recess 242, each with the form of a generally circular depression.

In the divider block 238 is also formed a circumferential groove 244 that opens onto the outer peripheral face of the divider block 238 and that extends in the circumferential direction. Bach of the two ends of this circumferential groove 244 open in the face of the divider block 238 on one side in the axial direction. Also formed in the divider block 238 is an axial groove 246 that opens onto the outer peripheral face of the divider block 238 and that extends in a straight line over a predetermined distance in the axial direction. The upper end of this axial groove 246 utilizes one end of the circumferential groove 244 to open in the upper face of the divider block 238. The lower end of the axial groove 246 connects to the lower central recess 242 through a connecting hole 248 that extends in a tunnel configuration in the diametrical direction.

Additionally, the upper central recess 240 of the divider block 238 is provided in the depth wise medial portion thereof with a stepped face 250, thereby forming a stepped circular recess composed of a small-diameter recess portion 252 on the bottom end and a large-diameter recess portion 254 on the opening end. An annular groove 256 of generally ring shape seen in plan view is formed in the stepped face 250, extending continuously around the entire circumference in the circumferential direction of the axially medial portion.

Around the lower central recess 242 of the divider block 238, there is formed an annular recess 260 of generally ring shape seen in bottom view, opening in one direction in the axial direction (down in FIG. 12), while leaving a pair of diametrical linking portions 258, 258 that extend from the outer peripheral wall of the lower central recess 242 towards the outer peripheral wall of the divider block 238. With this arrangement, the peripheral wall of the lower central recess 242 is linked to the outer peripheral wall of the divider block 238 substantially exclusively by the pair of diametrical linking portions 258, 253. One of the diametrical linking portions 258 has a wider shape than the other, and through its interior passes a connecting hole 248 by which the axial recess 246 and the lower central recess 242 communicate with one another. The annular recess 260 is formed with a depth dimension extending down to the bottom of the annular groove 256, whereby the bottom portion of the annular groove 256, excluding the locations where the diametrical linking portions 258, 258 are formed, opens into the annular recess 260.

In the peripheral wall of the small-diameter recess 252 is bored a communicating window 262 that extends over a predetermined length in the circumferential direction. In this embodiment in particular, a pair of communicating windows 262 of slot shape extending over a distance slightly less than halfway around the circumference are formed spaced apart in the circumferential direction. With this arrangement, the small-diameter recess 252 communicates with the annular recess 260 through the pair of communicating windows 262, 262. With the divider block 238 securely mated with the second mount fitting 214, the annular recess 260 opens facing the rubber diaphragm 230, whereby the communicating windows 262 in the divider block 233 and the small-diameter recess 252 and annular recess 260 that communicate with one another through the communicating windows 262 constitute part of the equilibrium chamber 236.

A movable member 264 functioning as a movable partition member is installed into the large-diameter recess portion 254. From the top of the movable member 264, a cover plate fitting 266 is assembled overlapping the upper face of the divider block 238.

Figure 16:
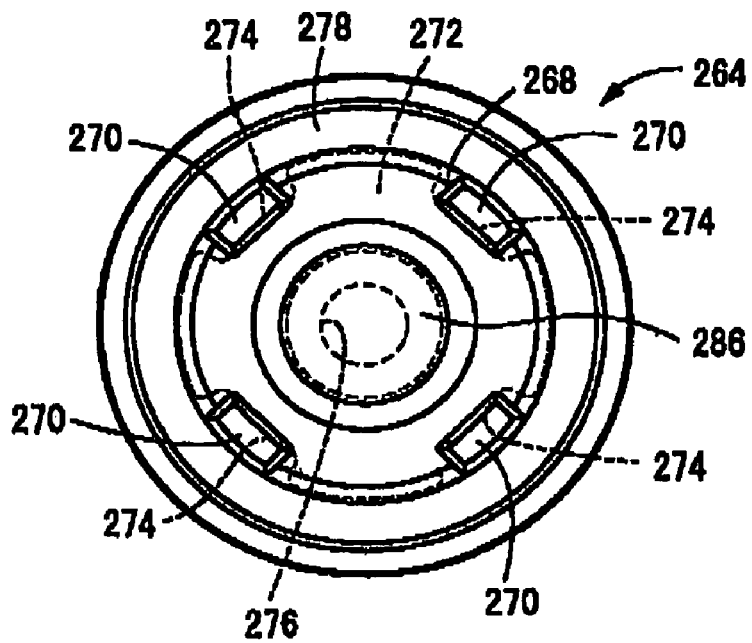
FIG. 16 is a top plane view of a movable member of the engine mount of FIG. 12.
Figure 17:
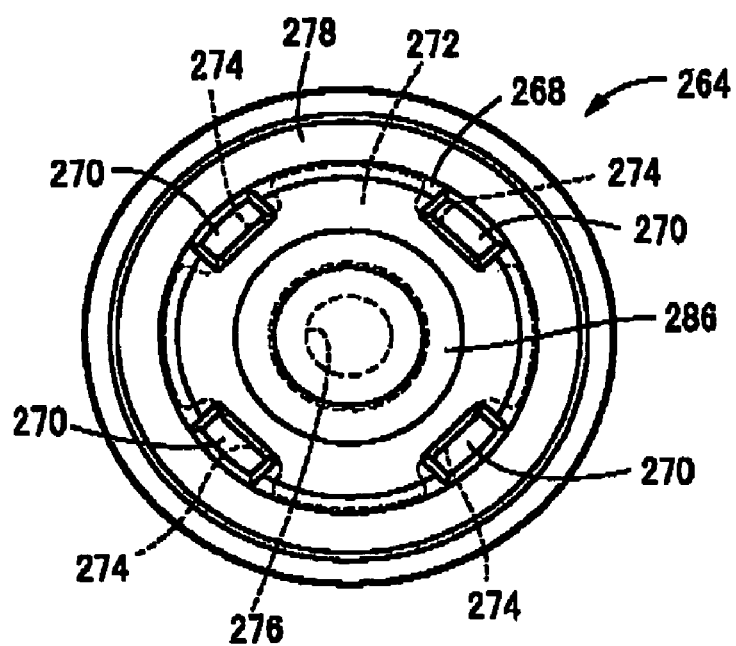
FIG. 17 is a bottom plane view of the movable member of FIG. 16.

As illustrated in the single component diagrams in FIGS. 16 and 17, the movable member 264 has a circular, generally thin plate shape, and is formed by a rubber elastic body. The movable member 264 is securely mated with the large-diameter recess portion 254 of the divider block 238, whereby the opening of the upper central recess 240 is provided with fluid-tight closure by the movable member 264, thus forming the pressure receiving chamber 234 above the movable member 264 on the one hand, while forming the equilibrium chamber 236 below the movable member 264.

The movable member 264, in a portion thereof situated generally on the inner peripheral edge of the stepped face 250 of the divider block 238, has an integrally formed annular elastic projection 268 that extends continuously or discontinuously in the circumferential direction. At several locations on the circumference of the elastic projection 268 (four locations in this embodiment) are integrally formed contact support portions 270 of generally plateau shape that project appreciably from the upper and lower faces. In this embodiment, the distal edge-to-edge dimension of the elastic projections 268, 268 to the upper and lower sides of the movable member 264 is designed to be slightly smaller than the axial dimension of the outer peripheral edge of the movable member 264, and the distal edge-to-edge dimension of the contact support portions 270, 270 on the upper and lower sides is designed to be generally the same as the axial dimension of the outer peripheral edge of the movable member 264.

Figure 18:
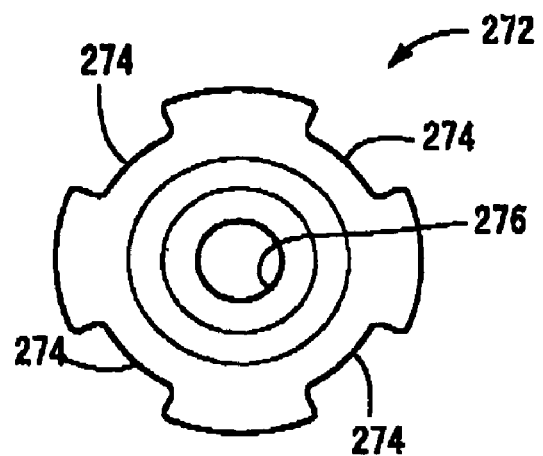
FIG. 18 is a top plane view of a constriction plate of the engine mount of FIG. 12.

A rigid constriction plate 272 consisting of metal or synthetic resin is embedded in the center portion of the movable member 264. As shown in FIG. 18, this constriction plate 272 is of generally shallow dish shape whose center portion is slightly recessed, and while thin, provides improved deformation rigidity. The constriction plate 272 has an outside diameter dimension larger than the inside diameter dimension of the upper central recess 240 of the divider block 238, with the outer peripheral edge of the constriction plate 272 extending out to the stepped face 250.

A notch 274 is formed at each of several locations on the outer peripheral edge of the constriction plate 272 corresponding to the upper and lower contact support portions 270, 270, providing clearance at the locations of the contact support portions 270, 270 when the constriction plate 272 is covered by the movable member 264. The center of the constriction plate 272 is perforated by circular hole 276 and covered by the rubber material making up the movable member 264. Forming this circular hole 276 affords good distribution of rubber material onto both faces of the constriction plate 272, and also improves bond strength of the rubber to the constriction plate 272. Additionally, by adjusting the size of the circular hole 276 and the thickness dimension of the rubber film closing off the circular hole 276, it is possible to appropriately adjust the elastic deformation characteristics of the movable member 264. It is not absolutely necessary to form the circular hole 276, however.

In the portion situated between the elastic projection 268 and the outer peripheral edge in the movable member 264 is formed a thin peripheral movable rubber film portion 278 of an annular plate shape extending in the circumferential direction with predetermined width. This peripheral movable rubber film portion 78 is situated on the annular groove 256 formed in the stepped face 250 of the divider block 238.

Figure 19:
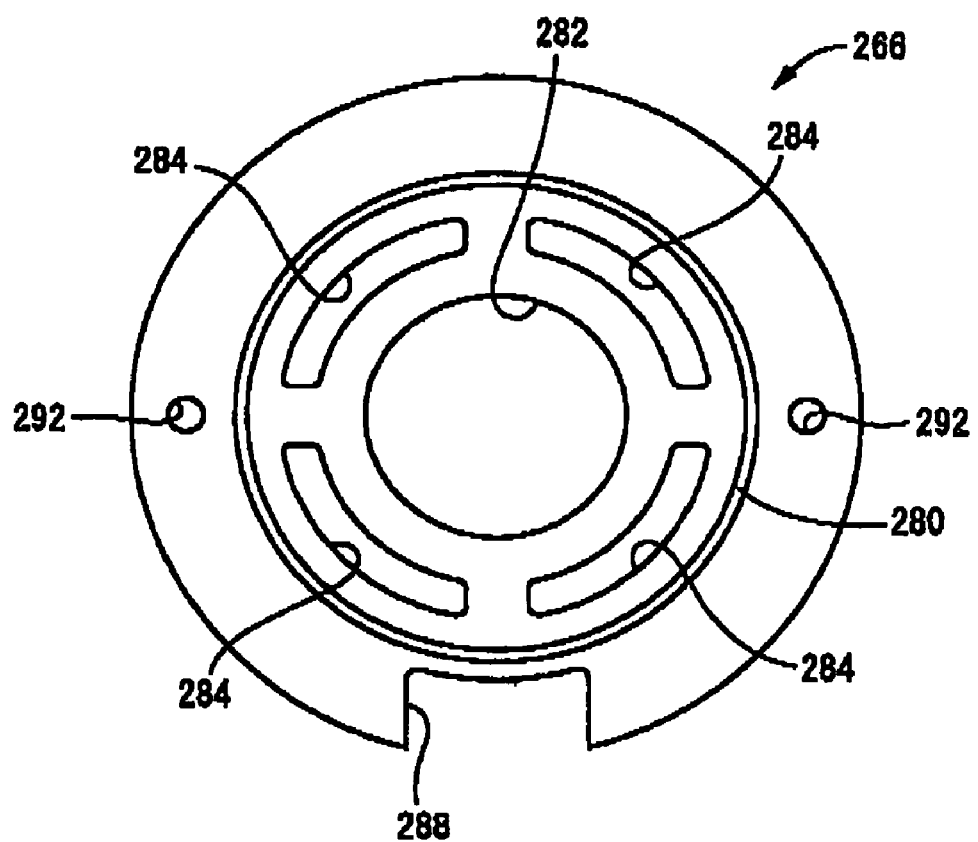
FIG. 19 is a top plane view of a cover plate fitting of the engine mount of FIG. 12.

As shown in FIG. 19, the cover plate fitting 266 has the overall form of a thin, generally disk shaped member having a slight stepped portion 280 formed in the diametrically medial portion, and a center portion projecting downward with respect to the outer peripheral edge portion. The cover plate fitting 66 is superposed onto the upper face of the divider block 238, and the stepped portion 280 is fitted into the opening of the upper central recess 240 of the divider block 238 to attach it positioned in the diametrical direction.

A round center through-hole 282 is formed in the center portion of the cover plate fitting 266, and around this center through-hole 282 are formed a number of outer peripheral through-holes 284 that extend a predetermined width in the circumferential direction. When the cover plate fitting 266 is installed on the divider block 238, a center movable plate portion 286 of the movable member 264 reinforced by the constriction plate 272 faces the pressure receiving chamber 234 through the center through-hole 282, and the peripheral movable rubber film portion 278 faces the pressure receiving chamber 234 through the outer peripheral through-holes 284. The peripheral movable rubber film portion 278 faces the equilibrium chamber 236 through the annular groove 256 of the divider block 238.

A notched window 288 is provided at single circumferential location on the outer peripheral edge of the cover plate fitting 266, this notched window 288 being situated aligned with the upper opening shared by the circumferential groove 244 and the axial groove 246 provided to the divider block 238. In order to position the notched window 288 and grooves 244, 246 so as to be aligned with one another, a positioning projection 290 is disposed projecting from an appropriate location on the circumference of the upper and face of the divider block 238, and a positioning hole 292 is formed at a corresponding location on the cover plate fitting 266, with positioning in the circumferential direction being realized through the mating action of the positioning projection 290 and the positioning hole 292.

Figure 20:
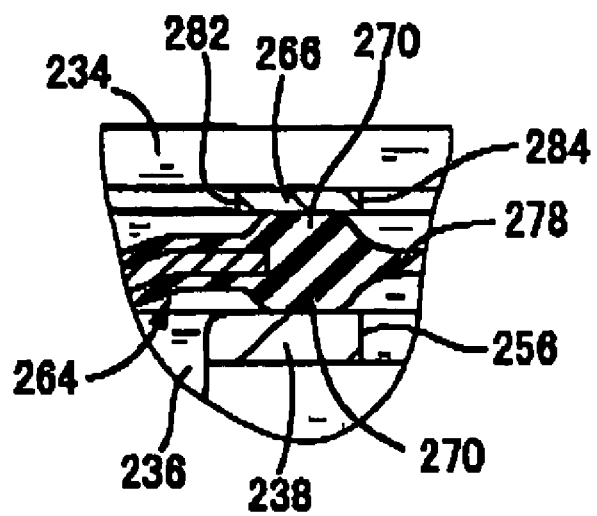
FIG. 20 is an enlarged fragmentary view in vertical cross section of a part of the engine mount of FIG. 12.

With the movable member 264 and the cover plate fitting 266 attached to the divider block 238 in the above manner, as shown in enlarged view in FIG. 20, the contact support portions 270 of the movable member 264 are disposed with the distal end faces thereof contacting the stepped face 250 of the divider block 238 or the lower face of the cover plate fitting 266, and appropriately compressed where necessary. The outer peripheral edge of the movable member 264 constitutes an elastic mating portion 294 of large axial dimension; when attached to the divider block 238, the elastic mating portion 294 is disposed between the stepped face 250 of the divider block 238 and the cover plate fitting 266, while being compressively deformed in the direction of proximity of the divider block 238 and the cover plate fitting 266. With this arrangement, fluid-tight closure is provided to the opening of the upper central recess 240 in the divider block 238.

Figure 21:
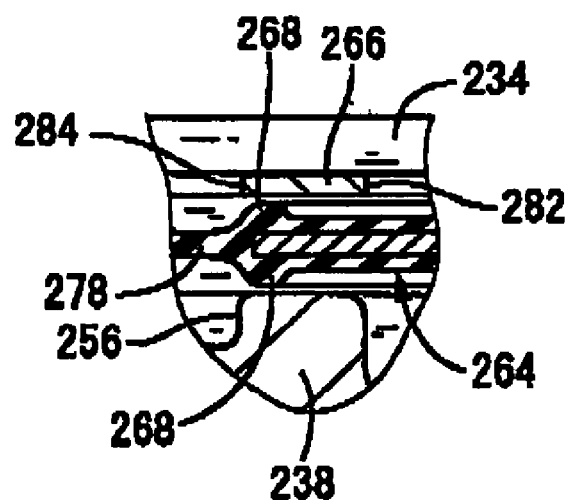
FIG. 21 is an enlarged fragmentary view in vertical cross section of another part of the engine mount of FIG. 12.

As shown in enlarged view in FIG. 21, the elastic projection 268 is positioned across a slight gap from the stepped face 250 of the divider block 238 or the lower face of the cover plate fitting 266. When a pressure fluctuation of the pressure receiving chamber 234 is exerted against the movable member 264, the movable member 264 undergoes displacement and deformation on the basis of the pressure difference between the pressure receiving chamber 234 and the equilibrium chamber 236 exerted across the upper and lower faces of the movable member 264. In this embodiment, the elastic projection 268 functions as an elastic contact projection and is brought into contact against a displacement restricting member in the form of the cover plate fitting 266, thereby providing displacement limiting member for cushion-wise limitation of an extent of displacement of the center movable plate portion 286.

With this arrangement, the deformation of the center movable plate portion 286 of the movable member 264 is limited by the constriction plate 272 embedded therein. Thus, the displacement will be occurred principally on the basis of elastic deformation of the contact support portions 270, 270. The peripheral movable rubber film portion 278, on the other hand, is thin and readily undergoes elastic deformation on the basis of a pressure differential between the pressure receiving chamber 234 communicating through the peripheral throughholes 284 of the cover plate fitting 266 and the equilibrium chamber 236 communicating through the annular groove 256 of the divider block 238, so that displacement is produced due to deformation.

The openings of the circumferential groove 244 and the axial groove 246 formed on the outer peripheral face of the divider block 238 are each provided with fluid-tight closure by the second mount fitting 214. By providing closure to the circumferential groove 244, there is formed a first orifice passage 296 connecting the pressure receiving chamber 234 and the equilibrium chamber 236 to one another, this passage being normally in the open state. By providing closure to the axial groove 246, there is formed a second orifice passage 298 that passes from the connecting hole 248 through the lower central recess 242 of the divider block 238 and opens into the equilibrium chamber 236, connecting the equilibrium chamber 236 to the pressure receiving chamber 234.

This second orifice passage 298 is formed with approximately the same passage cross sectional area as the first orifice passage 296, and shorter passage length. By means of this design, the second orifice passage 298 is tuned to a higher frequency range than the first orifice passage 296. Specifically, the resonance frequency of fluid caused to flow through the first orifice passage 296 is tuned so as to exhibit, on the basis of resonance action of the fluid, high attenuation characteristics against engine shake or other low-frequency, small-amplitude vibration on the order of ±0.1 mm and 10 Hz, and engine shake or other low-frequency, large-amplitude vibration on the order of ±1.0 mm and 10 Hz, for example. The resonance frequency of fluid caused to flow through the second orifice passage 298 is tuned so as to exhibit, on the basis of resonance action of the fluid, high attenuation characteristics against idling vibration or other medium-frequency, medium-amplitude vibration on the order of ±0.1- 0.25 mm and 20-40 Hz, for example. The characteristic frequency of the movable member 264, based on displacement and deformation of the movable member 264, is tuned so that the movable member 264 is effectively made to produce resonance phenomenon against driving booming noise or other high-frequency, very small amplitude vibration on the order of ±0.1-0.02 mm and 60-120 Hz, for example.

To the mount body resulting from attachment of the divider member 228 and the rubber diaphragm 230 to the integrally vulcanization molded component of the rubber elastic body 216 having the first mount fitting 212 and the second mount fitting 214, there is additionally attached a bracket 218. The bracket 218 has a large-diameter, deep-bottomed generally bottomed cylindrical shape overall, and is fastened fitting onto the exterior of the second mount fitting 214. The bracket 218 is then secured press-fit into a cylindrical fastener fitting 300 having a large-diameter, generally cylindrical shape. The cylindrical fastener fitting 300 being bolted to the vehicle body, whereby the second mount fitting 314 is mounted onto the vehicle body by means of the bracket 318.

The bracket 318 is sufficiently deep-bottomed relative to the second mount fitting 314, so that with the second mount fitting 314 scoured fitting therein, there is formed an internal space 302 of sufficient size located in the lower portion of the bracket 318. By means of this internal space 302 the rubber diaphragm 230 is permitted to undergo bulging deformation to a sufficiently large extent.

Also disposed in the lower portion of the bracket 218 is a pneumatic actuator 304. This pneumatic actuator 304 utilizes the floor of the bracket 218 as a base housing 306, and is attached to the base housing 306 so that an output member 308 serving as the valve member is positioned inside the bracket 218.

The output member 308 comprises a divider rubber 310 of generally hat shape overall, with the center portion of the divider rubber 310 constituting an output portion 312 of inverted cup shape, and with the outer peripheral portion constituting a tapered, flange-shaped elastic peripheral wall portion 314 that flares downward on the diagonal from the rim at the lower end of the output portion 312. The output portion 312 has embedded therein a rigid reinforcing member 316 formed of metal or synthetic resin, while an annular press-fitting fixture 318 is vulcanization bonded to the outer peripheral edge of the peripheral wall portion 314.

By press fitting the press-fitting fixture 318 against the bottom peripheral wall of the bracket 218, the outer peripheral edge of the divider rubber 310 is placed in fluid-tight contact against the bottom face of the base housing 306 formed by the bracket 218. By means of this design, the opening of the output member 308 is provided with closure by the bottom wall of the base housing 306 to constitute the pneumatic actuator 304 having a pressure regulating air chamber 320 formed inside.

In this embodiment, a compressed coil spring 322 is attached accommodated within the pressure regulating air chamber 320, so that urging force is normally exerted in the direction pushing the output portion 312 and the base housing 306 apart from one another. An air port 324 passes through the center of the floor of the base housing 306. Pressure in the pressure regulating air chamber 320 can be controlled from the outside through this air port 324.

Specifically, with the engine mount 210 installed, an external air pressure line 326 is connected to the air port 324, and a switch valve 328 is connected via the air pressure line 326. In accordance with switching operation of the switch valve 328, the pressure regulating air chamber 320 is selectively connected to the atmosphere or to a negative pressure source 330.

With the pressure regulating air chamber 320 connected to the atmosphere, by mean of the action of the elastic behavior of the elastic peripheral wall portion 314 and the elastic behavior of the compressed coil spring 322 on the output portion 312, the output portion 312 is caused to project resiliently upward, urging the rubber diaphragm 230 upward and holding it pressed against the center lower face of the divider block 238 in the divider member 228. Since the contour of the output portion 312 is larger than the opening diameter of the lower central recess 242 formed on the center lower face of the divider block 238, the center portion of the rubber diaphragm 230 is pushed against the opening of the lower central recess 242 and provides substantially fluid-tight closure thereto, whereby the second orifice passage 298 which opens into the equilibrium chamber 236 through the lower central recess 242 is closed off.

On the other hand, with the pressure regulating air chamber 320 connected to the negative pressure source 330, on the basis of the pressure differential between outside atmospheric pressure and the negative pressure exerted inside the pressure regulating air chamber 320, the output portion 312 is drawn into the pressure regulating air chamber 320 in opposition to the elastic behavior of the elastic peripheral wall portion 314 and the elastic behavior of the compressed coil spring 322, causing it to become displaced axially downward. Thus, the rubber diaphragm 230 separates from the opening of the lower central recess 242, opening the second orifice passage 298 and placing it in the open state.

In this embodiment, the switch valve 328 is switched by the controller 332 according to whether the vehicle is driving or at a stop. That is, during driving, the pressure regulating air chamber 320 is connected to the atmosphere, whereas when at a stop, the pressure regulating air chamber 320 is connected to the negative pressure source 330. The controller 332 is advantageously constituted, for example, so as to output a drive control signal to an electromagnetic solenoid constituting the switch valve 328, by means of an acceleration sensor or the like.

Accordingly, in the engine mount 210 of the construction described above, low frequency, large amplitude vibration input when driving over a speed bump or the like is not attended by consequent liquid pressure absorption through displacement and deformation of the movable member 264 comprising the center movable plate portion 286 and the peripheral movable rubber film portion 278, so that effective pressure fluctuation is produced in the pressure receiving chamber 234. With this arrangement, relative pressure fluctuations between the pressure receiving chamber 234 and the equilibrium chamber 236 are effectively produced. Thus, as long as the second orifice passage 298 is maintained in the closed state by the output member 308, fluid flow volume through the first orifice passage 296 is advantageously assured, a high level of attenuating effect based on flow action, e.g. resonance action, of the fluid induced to flow through the first orifice passage 296 is exhibited, and excellent vibration damping ability is achieved.

In response to low frequency, small-amplitude vibration input during normal driving, as with the low frequency, large-amplitude vibration described earlier, as long as the second orifice passage 298 is maintained in the closed state by the output member 308, fluid flow volume through the first orifice passage 296 is advantageously assured. Thus, a high level of attenuating effect based on flow action, e.g. resonance action, of the fluid induced to flow through the first orifice passage 296 is exhibited, and excellent vibration damping ability is achieved. While pressure absorption of the pressure receiving chamber 234 by the movable member 264 is a concern, in this embodiment, since fluid-tightness at the outer peripheral side of the center movable plate portion 286 is assured by the peripheral movable rubber film portion 278, and since the extent of deformation of the movable member 264 is suppressed by the rigidity of the center movable plate portion 286, whereby adequate pressure fluctuations are created in the pressure receiving chamber 234.

Since pressure fluctuations of the pressure receiving chamber 234 in response to high-frequency, very small amplitude vibration input during driving are extremely small, the pressure fluctuations of the pressure receiving chamber 234 are effectively absorbed and lessened by means of displacement and deformation of the movable member 264. In particular, since the center movable plate portion 286 of the movable member 264 can be formed in the center portion to advantageously assure effective surface area, whereas the outer peripheral edge portion thereof is constituted as fluid-tightly supported, readily deformable peripheral movable rubber film portion 278, following displacement in response to high frequency pressure fluctuations in the pressure receiving chamber 234 can advantageously be achieved, and pressure fluctuations in the pressure receiving chamber 234 can be suppressed.

Additionally, since the characteristic frequency of the movable member 264 is tuned to the high frequency range of vibration to be damped, when high frequency vibration is input, the movable member 264 more advantageously undergoes following displacement on the basis of resonance action. Thus, when high frequency vibration is input, even with the first and second orifice passages 296, 298 in the substantially closed state, sharp pressure fluctuations in the pressure receiving chamber 234 can be avoided by means of the movable member 264, and excellent vibration damping action may be achieved by means of effective vibration isolating action based on low dynamic spring characteristics.

Further, in response to medium-frequency, medium-amplitude vibration input with the vehicle at a stop, while pressure absorption of the pressure receiving chamber 234 by the movable member 264 is a concern, in this embodiment, since the extent of deformation of the movable member 264 is suppressed on the basis of the rigid center movable plate portion 286 disposed in the center portion of the movable member 264, and since the peripheral movable rubber film portion 278 is disposed to the outside of the center movable plate portion 286, ensuring that the pressure receiving chamber 234 is fluid-tight, pressure leakage from the pressure receiving chamber 234 to the equilibrium chamber 236 are avoided, so that adequate pressure fluctuations are created in the pressure receiving chamber 234. Thus, by means of operation of the pneumatic actuator 304 to place the second orifice passage 298 in the open state, a sufficient level of fluid flow through the second orifice passage 298 is adequate assured, whereby high damping effect based on flow action, e.g. resonance action, of the fluid induced to flow through the second orifice passage 298 is achieved, and excellent vibration damping ability is exhibited. Additionally, with the second orifice passage 298 in the open state, the first orifice passage 296 is in the open state as well, but since medium-frequency input vibration of a frequency range above of the tuning frequency of the first orifice passage 296 will be countered by the first orifice passage 296 becoming substantially closed due to antiresonant action of fluid through the first orifice passage 296, the level of fluid flow through the second orifice passage 298 is effectively assured.

Accordingly, in the engine mount 210 of this embodiment, the first orifice passage 296, the second orifice passage 298, and the movable member 264 each function efficiently in response to the frequency and amplitude of vibration to be damped, whereby effective vibration damping action is exhibited against vibration of multiple, wide frequency ranges.

In this embodiment, the movable member 264 that comprises a center movable plate portion 286 and a peripheral movable rubber film portion 278 is employed. In the event where suppression of liquid pressure absorption of the pressure receiving chamber 234 by the movable member 264 is required to thereby effectively producing pressure fluctuations in the pressure receiving chamber 234, e.g. during input of low-frequency, small-amplitude vibration or medium-frequency, medium-amplitude vibration as described previously, since the fact that the extent of deformation of the movable member 264 is suppressed by the rigid center movable plate portion 268 formed in the center of the movable member 264, and since fluid-tightness on the outer peripheral side of the center movable plate portion 286 is assured by the peripheral movable rubber film portion 278, effective pressure fluctuations are produced in the pressure receiving chamber 234. Thus, since adequate fluid flow levels through the first orifice passage 296 or second orifice passage 298 are assured, by selectively switching the second orifice passage 298 between the open state and the closed state, vibration damping effect based on fluid flow action through the orifice passages 296, 298 can be advantageously achieved. As will be understood from the foregoing description, an intermediate equilibrium chamber is formed by a portion 236' formed integrally with the equilibrium chamber 236 in this embodiment.

As a result, even in the absence of a special construction as taught in for example JP-A-2002-5225 whereby an air chamber is formed on the opposite side of the movable member from the pressure receiving chamber, and air pressure from the outside (either negative pressure or positive pressure) is exerted causing the movable member to undergo constricting deformation, the desired vibration damping effect can nevertheless be achieved on the basis of suppressing the extent of deformation and displacement by means of the construction of the movable member 264 so that pressure fluctuations are effectively produced in the pressure receiving chamber 234. Thus, the desired vibration damping effect can be achieved consistently, by memos of ensuring a high degree of freedom in design of placement space etc. of the first orifice passage 296, the second orifice passage 298, and the movable member 264 in association with the simpler internal structure including the divider member 228.

Additionally, since as compared to the vibration damping mount of conventional construction including that of JP-A-2002-5225 cited above, there is no need to form in the divider member an air chamber or air passage for exerting air pressure on the air chamber from the outsides or to provide an air port in the second mount fitting, manufacture is easier, and good fluid-tightness of the pressure receiving chamber 234 and the equilibrium chamber 236 may be assured.

In this embodiment, provided that the level of fluid-tightness required of the pressure receiving chamber 234 is assured, even in the event that there is some leakage of fluid from the pressure receiving chamber 234 to the outside of the movable member 264, since the opposite side of the movable member 264 from the pressure receiving chamber 234 is the equilibrium chamber 236, there is no problem of fluid leaking out into an unsealed zone, whereby quality performance may be improved.

Further, in this embodiment, by forming the elastic projection 268 and the contact support portions 279 as elastic contact projections on the movable member 264, the extent of displacement of the movable member 264 can be limited, thus more effectively suppressing pressure absorption by the movable member 264 during input of low-frequency, small-amplitude vibration.

In the engine mount 210 of this embodiment, since the constriction plate 272 is securely embedded in the center movable plate portion 286 of the movable member 264, it is possible to more reliably suppress absorption of pressure fluctuations of the pressure receiving chamber 234 during low- to medium-frequency vibration input due to unwanted deformation of the center movable plate portion 286, whereby vibration damping action based on flow action in the first orifice passage 296 and the second orifice passage 298 is effectively exhibited.

While the present invention has been described in detail in its presently preferred embodiments, for illustrative purpose only, it is to be understood that the invention is by no means limited to the details of the illustrated embodiments, but may be otherwise embodied. It is also to be understood that the present invention may be embodied with various changes, modifications and improvements which may occur to those skilled in the art, without departing from the spirit and scope of the invention.

For example, in the second embodiment, it is possible to modify appropriately the shape, size, and construction of the small-diameter recess portion constituting part of the equilibrium chamber 236, the communicating window 262, and the annular recess 260 to make part of the equilibrium chamber 236 function as a fluid passage, as well as to tune the resonance frequency of the fluid induced to flow through the flow passage to a high-frequency, very small-amplitude vibration frequency range on the order of ±0.03 and 80 Hz, for example.

Also, whereas in the second embodiment hereinabove, the center movable plate portion 286 is reinforced by embedding a rigid constriction plate 272, the constriction plate 272 could be dispensed with. Specifically, by making the movable member 264 thicker as necessary to impart sufficient rigidity, it becomes possible to exhibit functionality as the center movable plate portion 256, even without being reinforced by the constriction plate 272.

Also, whereas in the embodiment hereinabove a compressed coil spring 322 is used as the urging means for pushing against the opening of the lower central recess 242, the urging means is not limited to that taught in the embodiment. Specifically, it would be possible to instead simply utilize the elastic behavior of the divider rubber 310 to maintain a state of contact, or to use a plate spring or the like instead of a compressed coil spring 322.

The shape, size, and construction of the center movable plate portion 286 and the peripheral movable rubber film portion 278 in the movable member 264, as well as the placement location of the movable member 64 with respect to the divider member 228, are not limited to those taught herein by way of example, and may be modified appropriately depending on the required vibration damping characteristics, producibility, and other considerations.

The shape, size, construction, and number of the orifice passages formed in the divider member 228 are not limited to the first and second orifice passages taught in the second embodiment hereinabove, with appropriate modifications thereto being apparent to the skilled practitioner of the art.

Further, whereas the embodiment hereinabove describes application of the invention in an automotive engine mount by way of a specific example, the invention could of course be implemented advantageously in non-automotive engine mounts as well.

What is claimed is:

1. A pneumatically switchable type fluid-filled engine mount, comprising:

a first mounting member attachable to one of a power unit side member and a vehicle body side member;

a second mounting member attachable to another of the power unit side member and the vehicle body side member;

a rubber elastic body elastically connecting the first mounting member and the second mounting member;

a pressure receiving chamber partially defined by the rubber elastic body, filled with a non-compressible fluid, and subjected to input of vibration;

an equilibrium chamber partially defined by a flexible layer for readily permitting change in volume thereof, and filled with the non-compressible fluid;

a first orifice passage for fluid communication between the pressure receiving chamber and the equilibrium chamber, tuned to a low frequency range generally corresponding to engine shake;

a second orifice passage for fluid communication between the pressure receiving chamber and the equilibrium chamber, tuned to a medium frequency range generally corresponding to idling vibration;

a valve member for opening/closing the second orifice passage;

a pneumatic actuator operated by air pressure from the outside, for driving the valve member;

a movable partition member whose center portion constitutes a rigid center movable plate portion and whose outer peripheral portion constitutes a readily deformable outer peripheral rubber film portion, disposed so that an outer peripheral edge of the outer peripheral rubber film portion is supported fluid-tightly by the second mounting member, permitting displacement and deformation in the center movable plate portion and the outer peripheral rubber film portion, the movable partition member defining another part of the pressure receiving chamber; and an intermediate equilibrium chamber formed on an opposite side of the movable partition member from the pressure receiving chamber with the movable partition member interposed between the intermediate equilibrium chamber and the pressure receiving chamber, wherein an elastic contact projection is formed projecting out from an outer peripheral edge portion of the center movable plate portion in the movable partition member, the elastic contact projection being positioned in contact against the second mounting member or a displacement restricting member supported by the second mounting member, thereby providing a displacement limiting member for cushion-wise limitation of an extent of displacement of the center movable plate portion, a rigid constriction plate is disposed in the center movable plate portion of the movable partition member, with the outer peripheral rubber film portion being bonded to the constriction plate, a plurality of elastic contact support portions are integrally formed projecting out from the outer peripheral edge portion of the center movable plate portion in the movable partition member with a projection height greater than that of the elastic contact projection at both sides as measured in a thickness direction of the center movable plate portion, and the elastic contact support portions are held in contact with the second mounting member or the displacement restricting member supported by the second mounting member so that the rigid constriction plate of the center movable plate portion is elastically supported by the elastic contact support portions.

2. A pneumatically switchable type fluid-filled engine mount according to claim 1, wherein the intermediate equilibrium chamber comprises an air chamber open to an atmosphere.

3. A pneumatically switchable type fluid-filled engine mount according to claim 2, wherein the first mounting member is disposed at and spaced apart from a first axial open end of the second mounting member of cylindrical shape, with the first mounting member and the second mounting member being connected by the rubber elastic body to thereby fluid-tightly close the first axial open end of the second mounting member, and another open end of the second mounting member is covered fluid-tightly by the flexible layer, while a partition member is disposed between the rubber elastic body and the flexible layer and supported by the second mounting member so that the pressure receiving chamber and equilibrium chamber are formed to either side of the partition member; wherein the movable partition member is disposed in the partition member on a side facing the pressure receiving chamber, and the air chamber is formed on a back side of the movable partition member remote from the pressure receiving chamber in the partition member, while an air passage is formed extending from the air chamber to an outer circumferential surface of the second mounting member through the partition member and the second mounting member; wherein the first orifice passage is formed so as to extend along an outer peripheral portion of the partition member in an circumferential direction, and the second orifice passage is formed so as to extend with a predetermined length in an axial direction at an outer peripheral side of the movable partition member in the partition member, and extend radially inwardly through an inner portion of the partition member, the second orifice passage being open to the pressure-receiving chamber through a first opening formed at an outer peripheral side of the movable partition member in the partition member and being open to the equilibrium chamber through a second opening formed at a central portion of the partition member; and wherein the flexible layer is superimposed onto the second opening of the second orifice passage to constitute the valve member, the valve member being driven by the actuator to carry out opening/closing control of the second orifice passage by alternately opening and closing the second opening of the second orifice passage, and a second opening peripheral portion that extends outwardly in an axis-perpendicular direction from the second opening of the second orifice passage has a dilated shape of gradually increasing width dimension in the circumferential direction going outwardly in the axis-perpendicular direction.

4. A pneumatically switchable type fluid-filled engine mount according to claim 1, wherein the intermediate equilibrium chamber is formed integrally with the equilibrium chamber so that the center movable plate portion and the peripheral movable rubber film portion undergo displacement and deformation on the basis of a pressure difference between the pressure receiving chamber formed on one side thereof and the equilibrium chamber formed on an other side thereof so as to absorb, by means of the displacement and deformation, pressure fluctuation in the pressure receiving chamber during input of vibration in a high frequency band corresponding to drive booming noise.

5. A pneumatically switchable type fluid-filled engine mount according to claim 4, wherein a portion of the intermediate equilibrium chamber is constricted to form a fluid passage, and the displacement and deformation of the movable partition member based on a pressure difference between the pressure receiving chamber and the equilibrium chamber, exerted on either face of the movable partition member permits a substantial fluid flow through the fluid passage.

6. A pneumatically switchable type fluid-filled engine mount according to claim 4, wherein the first mounting member is disposed at and spaced apart from a first axial open end of the second mounting member of cylindrical shape, with the first mounting member and the second mounting member being connected by the rubber elastic body to thereby fluid-tightly close the first axial open end of the second mounting member, and another open end of the second mounting member is covered fluid-tightly by the flexible layer, while a partition member is disposed between the rubber elastic body and the flexible layer and supported by the second mounting member so that the pressure receiving chamber and equilibrium chamber are formed to either side of the partition member; wherein the movable partition member is displaceably and deformably disposed so as to extend at a generally right angle to the direction of opposition of the pressure receiving chamber and the equilibrium chamber in the partition wall member; and wherein the first orifice passage is formed so as to extend along an outer peripheral portion of the partition member in an circumferential direction, and the second orifice passage is formed so as to extend with a predetermined length in an axial direction at an outer peripheral side of the movable partition member in the partition member, and extend radially inwardly through an inner portion of the partition member, the second orifice passage being open to the pressure-receiving chamber through a first opening formed at an outer peripheral side of the movable partition member in the partition member and being open to the equilibrium chamber through a second opening formed at a central portion of the partition member; and wherein the flexible layer is superimposed onto the second opening of the second orifice passage to constitute the valve member, the valve member being driven by the actuator to carry out opening/closing control of the second, orifice passage by alternately opening and closing the second opening of the second orifice passage.

7. A pneumatically switchable type fluid-filled engine mount according to claim 1, wherein the pneumatic actuator is operable such that during driving of an automobile, the valve member is driven by generally atmospheric pressure applied from an outside whereby the second orifice passage assumes a closed state thereof, and when the automobile is at a stop the valve member is driven by negative pressure applied from the outside whereby the second orifice passage assumes an open state.

8. A pneumatically switchable type fluid-filled engine mount according to claim 1, wherein displacement and deformation characteristics of the movable partition member are designed so that, in the event that input vibration applied across the first mounting member and the second mounting member is very small amplitude vibration of ±0.05 mm or less, pressure fluctuations produced in the pressure receiving chamber can be substantially absorbed; whereas in the event that input vibration applied across the first mounting member and the second mounting member is small amplitude vibration of about ±0.1 mm or large amplitude vibration of ±1.0 mm or more, pressure fluctuations produced in the pressure receiving chamber cannot be substantially absorbed.

9. A pneumatically switchable type fluid-filled engine mount according to claim 6, wherein the peripheral movable rubber film portion is situated on an annular groove formed in the partition member supported by the second mounting member and connected to the equilibrium chamber.

10. A pneumatically switchable type fluid-filled engine mount according to claim 1, wherein the elastic contact projection is formed on the rigid constriction plate while the elastic contact support portions are formed on respective portions away from the rigid constriction plate.

* * * * *